US012801869B2

(12) United States Patent
Goodwin et al.

(10) Patent No.: US 12,801,869 B2
(45) Date of Patent: Nov. 17, 2026

(54) ANALOG MULTIPLIER

(71) Applicant: Fractile Ltd., Newbury (GB)

(72) Inventors: Walter Thomas Rombold Goodwin, Newbury (GB); Anthony Ian Stansfield, Newbury (GB)

(73) Assignee: Fractile Ltd., Newbury (GB)

( * ) Notice: Subject to any disclaimer, the term of this patent is extended or adjusted under 35 U.S.C. 154(b) by 0 days.

(21) Appl. No.: 19/444,008

(22) Filed: Jan. 8, 2026

(65) Prior Publication Data

US 2026/0195550 A1 Jul. 9, 2026

(30) Foreign Application Priority Data

Jan. 9, 2025 (GB) ..................................... 2500229

(51) Int. Cl.

*G06G 7/16* (2006.01)
*G06F 7/544* (2006.01)
*G06F 15/78* (2006.01)
*G06F 17/16* (2006.01)

(52) U.S. Cl.

CPC ............. *G06G 7/16* (2013.01); *G06F 7/5443* (2013.01); *G06F 15/7821* (2013.01); *G06F 17/16* (2013.01)

(58) Field of Classification Search

CPC .... G06F 7/5443; G06F 17/16; G06F 15/7821; G06G 17/16; G06G 7/16

See application file for complete search history.

(56) References Cited

U.S. PATENT DOCUMENTS

| | | | | |
|---|---|---|---|---|
| 10,825,510 | B2 * | 11/2020 | Jaiswal | G11C 11/412 |
| 11,354,383 | B2 * | 6/2022 | Guo | G06F 7/5443 |
| 11,494,464 | B1 | 11/2022 | Agarwal et al. | |
| 2018/0373902 | A1 * | 12/2018 | Muralimanohar | G11C 13/00 |
| 2021/0097131 | A1 | 4/2021 | Guo et al. | |
| 2022/0066740 | A1 | 3/2022 | Radhadevi et al. | |
| 2023/0115373 | A1 * | 4/2023 | Badaroglu | G06F 7/5443 708/670 |
| 2024/0177772 | A1 * | 5/2024 | Castro | G06F 7/5443 |
| 2024/0303037 | A1 * | 9/2024 | Castro | G06F 7/523 |

(Continued)

OTHER PUBLICATIONS

Khaddam-Aljameh, R. et al., An SRAM-Based Multibit In-Memory Matrix-Vector Multiplier With a Precision That Scales Linearly in Area Time and Power, IEEE Transactions on Very Large Scale Integration (VLSI) Systems, 29(2):372-385, Feb. 2021.

*Primary Examiner* — Matthew D Sandifer

(74) *Attorney, Agent, or Firm* — Polsinelli PC; Gregory P. Durbin

(57) ABSTRACT

A multiplier for multiplying a matrix with a vector, comprising: a plurality of subarrays having rows and groups of columns of storage cells, each subarray storing values of a submatrix in the cells, each matrix element is stored in a row across a group of columns, each column associated with a bit value of an element of the submatrix, each subarray is associated with a scale; the multiplier to: for each subarray, obtain a dot product of each column with at least a portion of the vector; perform one of two options: for each group of columns for each subarray, obtain a weighted sum of the group of columns according to the associated bit value for each column; and multiply each subarray with the scale and obtain a sum of columns of the scaled subarrays corresponding to a column of the matrix; perform the other option.

20 Claims, 16 Drawing Sheets

(56) References Cited

U.S. PATENT DOCUMENTS

| | | | | |
|---|---|---|---|---|
| 2024/0304254 | A1* | 9/2024 | Castro | G11C 11/54 |
| 2025/0103678 | A1* | 3/2025 | Gutta | G06F 7/4983 |
| 2025/0284459 | A1* | 9/2025 | Chiou | G06F 7/5443 |

* cited by examiner

ANALOG MULTIPLIER

CROSS-REFERENCE TO RELATED APPLICATION

This application is related to and claims priority to GB Application No. 2500229.6 filed Jan. 9, 2025, titled "Analog Multiplier," the entire contents of which is incorporated herein by reference for all purposes.

TECHNICAL FIELD

The present disclosure relates to analog circuits for matrix-vector multiplication, such as for compute-in-memory matrix-vector multiplication for applications such as machine learning.

BACKGROUND

Matrix-vector multiplication is used in a variety of applications such as machine learning. Analog multiplication circuits may be used for low power calculation of matrix-vector multiplication. Issues may arise when implementing very large scale processing, such as with signal magnitudes.

The examples described herein are not limited to examples which solve problems mentioned in this background section.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first aspect of the disclosed technology is a compute-in-memory matrix multiplier for multiplying a matrix with a vector, comprising: an array comprising a plurality of sub arrays, each sub array having rows and groups of columns of storage cells, each sub array storing values of a sub matrix of the matrix in the storage cells, wherein each element of the matrix is stored in a row across a group of columns, each column of the group of columns associated with a bit value of an element of the sub matrix, wherein each sub array is associated with a scale; wherein the compute-in-memory matrix multiplier is configured to: perform a first operation comprising: for each sub array, obtain a dot product of each column with at least a portion of the vector; subsequent to performing the first operation, perform a second operation comprising any one of two options, wherein the two options are: for each group of columns for each sub array, obtain a weighted sum of the group of columns according to the associated bit value for each column of the group of columns; and multiply each sub array with the scale associated with the sub array and obtain a sum of columns of the scaled sub arrays corresponding to a column of the matrix; subsequent to performing the second operation, perform a third operation, wherein the third operation comprises performing the other one of the two options.

A second aspect of the disclosed technology is a method for multiplying a matrix with a vector in a compute-in-memory matrix multiplier, comprises: storing the matrix in an array, wherein the array comprises a plurality of sub arrays, each sub array having rows and groups of columns of storage cells, wherein the storing comprises storing, in each sub array, values of a sub matrix of the matrix in the storage cells, wherein each element of the matrix is stored in a row across a group of columns, each column of the group of columns associated with a bit value of an element of the sub matrix, wherein each sub array is associated with a scale; performing a first operation, comprising: for each sub array, obtaining a dot product for each bit value of each column with at least a portion of the vector; subsequent to performing the first operation, performing a second operation comprising any one of two options, wherein the two options are: for each group of columns for each sub array, obtaining a weighted sum of the group of columns according to the associated bit value for each column of the group of columns; and multiplying each sub array with the scale associated with the sub array and obtaining a sum of the columns of the scaled sub arrays corresponding to a column of the matrix; subsequent to performing the second operation, performing a third operation, wherein the third operation comprises performing the other one of the two options.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

Figure 1A:
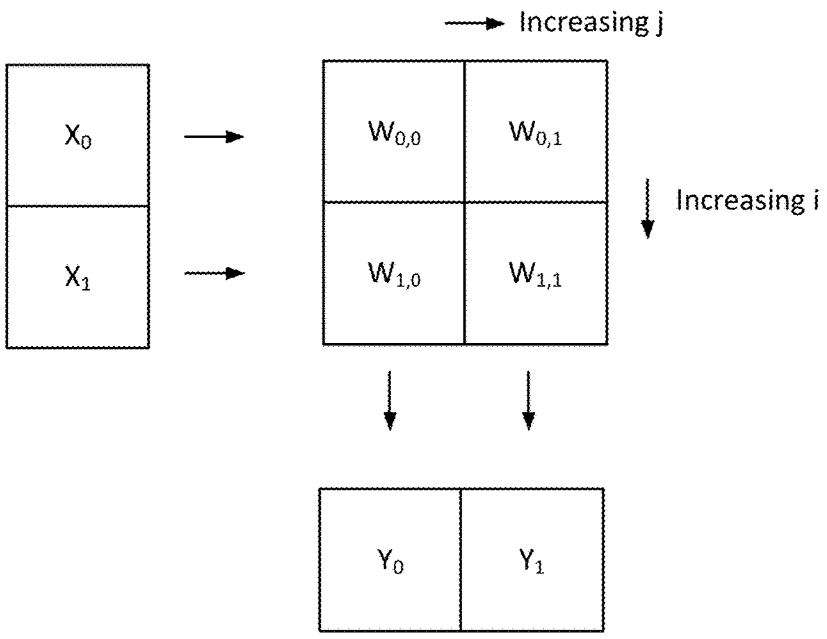
FIGS. 1A and 1B are schematic diagram of an example of hardware implementation of matrix vector multiplication.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

Matrix-vector multiplication is used in a variety of applications such as machine learning. For example, matrix-vector multiplication may be used in recognition or generative processes, including processes such as image recognition or generation, or speech recognition or generation. Existing integrated circuits often use digital multiplier circuits that are large and fast and reuse the same physical multiplier for multiple logical multiplications. If a multiplier can run ten times faster than is required by an application, then it can provide equivalent performance per unit area as would a multiplier that is ten times smaller but running ten times slower. Digital multipliers can provide high-precision results, but are large (with an area that varies approximately with the square of the number of bits in their input word), and have a high power dissipation due to high activity levels in their internal logic.

An alternative approach is to use analog multiplication circuits. This will give lower precision than can be achieved with digital multiplication, but with reduced power. By implementing a neural network in hardware as an analog neural network, it is possible to significantly improve efficiency and to reduce power requirements without detrimenting accuracy. This is achieved by using analog hardware with voltage and current relationships such as Ohm's Law and Kirchoff's current law to compute the same or similar mathematical function as a software neural network but using analog electric circuit components rather than a digital computer. There are good theoretical reasons which indicate that using such an analog neural network allows a speed-up over existing software neural networks (deployed on GPUs or multi-tile processors) by several orders of magnitude. For example, matrix-vector multiplication for neural network computation can be performed using analog processing.

In an example of matrix-vector multiplication Y=XW, X is a vector with two elements, such as $(X_0\ X_1)$, and W is a matrix of size (2,2), such as $$\begin{pmatrix} W_{0,0} & W_{0,1} \\ W_{1,0} & W_{1,1} \end{pmatrix},$$

where in $W_{i,j}$, i corresponds to index of the matrix row and j corresponds to index of the matrix column. The calculation to obtain the product vector Y is $$Y = \begin{pmatrix} X_0W_{0,0} + X_1W_{1,0} \\ X_0W_{0,1} + X_1W_{1,1} \end{pmatrix}.$$

Analog processing for vector matrix multiplication provides low-precision, massively parallel and low power processing. However, there are some issues that arise with very large scale analog processing.

For example, non-volatile memory implementations of matrix-vector multiplication require the availability of the relevant bit cells (i.e. RRAM, MRAM, Flash). These bit cells typically lag several technology generations behind the leading edge of pure CMOS. When very large scale analog processing is implemented, although these cells offer a much more compact implementation of matrix-vector multiplication than a purely digital approach on the same process, the process generation lag means that other parts of the system will be less dense.

Another issue is device variability. Purely transistor-based solutions, such as summing currents derived from multiple transistors, are subject to significant levels of process variation which may compromise the reliability of the calculations. This makes other approaches, such as such as summing of charges on capacitors, a more attractive option than using transistors. It can be easier to build using well-matched capacitances than well-matched transistors, where matching refers to the closeness of properties.

Another issue is signal dynamic range and signal-to-noise ratio. In very large scale analog processing, input signals may have a wide dynamic range. Intermediate signals should not exceed limits imposed by the IC technology. For example, intermediate signals should not exceed the safe operating range for the transistor gates and should not go outside the supply voltages by an amount sufficient to turn on parasitic diodes. Additionally, intermediate signals should not be so low that they are indistinguishable from noise. In an example problematic case, the analog process combines 1000 inputs, each of which could be in the range of 0V-1V.

If all inputs are near the top of the range, a capacitive sum would theoretically reach a voltage near 1000V. This will significantly exceed the supply voltages and the safe operating voltages, and is therefore not practical. Alternatively, a capacitive average is safe and accurate in this situation since the average will not exceed the largest of the individual inputs.

If all of the inputs are near the bottom of their range then the result of the averaging is a small voltage, at or close to the noise level in the system.

If most of the inputs are near the bottom of the range, but some are towards the top, then the average will be relatively small. The noise level can make this situation indistinguishable from the when all of the inputs are near the bottom of their range, even though the actual result would be different with a hypothetical process with infinite precision with no noise.

Of particular concern are those cases where the sum or averaging of inputs is followed by a subtraction, for instance as part of the processing of negative data. Subtractions may be performed to account for e.g. noise level. Sum outputs that are close to the noise level cannot be reliably subtracted without a large potential error in the result. In extreme cases what should be a small positive difference between values may actually be computed as a negative difference, or vice versa.

Therefore, there is a need to be able to manage the dynamic range of intermediate signals in a large-scale analog processing system.

Published research has shown that it is possible to reduce the precision of weights used in AI inference. Training often uses 32-bit or higher floating point numbers, but it is much more efficient (in hardware use and power consumption) to use a lower-precision fixed-point number format for inference if possible. The improvement in efficiency comes from both reducing the amount of memory required to store the weights, and from reducing the hardware needed to process them. However, it is not effective to simply round values from a high-precision, high bit count, representation to the nearest equivalent in a more compact low bit count form.

One useful technique in matrix-vector multiplication is to use a shared scale factor(S) for a group of weights, with the original weights Wi of the matrix being replaced with scaled weights $$W_i^j$$

where $$W_i = SW_i^j.$$

Both S and $$W_i^j$$

can be stored with lower precision than required for the original Wi, and the matrix vector multiplication $\Sigma_i W_i X_i$ becomes $$\sum_i SW_i^j X_i = S\sum_i W_i^j X_i$$

i.e. the calculation can be performed using reduced precision multiplications of elements X by the $$W_i^j$$

followed by a final scaling by S. In a large matrix-vector multiplication it is possible to subdivide the weights of the matrix into multiple sections of this form, which can then have different scale factors when combined to produce the final result. In an example, the elements of the vector may also have different scale factors.

In the present technology the input vector is in analog form such that the entries of the input vector are represented as continuous voltages. The output vector is also in analog form. The matrix stores numerical values such as, but not limited to, weights of a neural network. In an example this is expressed mathematically as W·X where X is a vector and W is a matrix.

FIG. 1A illustrates how matrix vector multiplication W·X as in the example above can be implemented in a circuit. The matrix $$\begin{pmatrix} W_{0,0} & W_{0,1} \\ W_{1,0} & W_{1,1} \end{pmatrix}$$

is stored in a group of cells, such that entries of the matrix are stored in corresponding cells of the circuit. In an example, the cells are bitcells. This arrangement of this circuit can be seen with the arrows for increasing i and increasing j in FIG. 1A. The input vector in analog form is applied to cells in the corresponding row of the circuit. The sums of the respective columns of cells provide the vector Y, which is the result of the multiplication, and is in the form ($Y_0$ $Y_1$).

In an example, a method for multiplying a matrix with a vector in a compute-in-memory matrix multiplier, comprises: storing the matrix in an array, wherein the array comprises a plurality of sub arrays, each sub array having rows and groups of columns of storage cells, wherein the storing comprises storing, in each sub array, values of a sub matrix of the matrix in the storage cells, wherein each element of the matrix is stored in a row across a group of columns, each column of the group of columns associated with a bit value of an element of the sub matrix, wherein each sub array is associated with a scale; performing a first operation, comprising: for each sub array, obtaining a dot product for each bit value of each column with at least a portion of the vector; subsequent to performing the first operation, performing a second operation comprising any one of two options, wherein the two options are: for each group of columns for each sub array, obtaining a weighted sum of the group of columns according to the associated bit value for each column of the group of columns; and multiplying each sub array with the scale associated with the sub array and obtaining a sum of the columns of the scaled sub arrays corresponding to a column of the matrix; subsequent to performing the second operation, performing a third operation, wherein the third operation comprises performing the other one of the two options.

With this method, there is an improvement in efficiency from both reducing the amount of memory required to store the weights, and from reducing the hardware needed to process them, by dividing the weights of the matrix into multiple sections with different scale factors. The multiple sections may be determined and the control sections of the array programmed for performing the calculation depending on the requirements of the application.

In an example, the matrix weights are mapped to a floating point digital representation. This is mapped to the analog hardware array for low bit representation of each weight. When mapping, the presence of outliers may mean that a small part of the available range on the hardware is used to store the majority of weight values when storing values in the array. In order to avoid this, the matrix and array are divided into sub matrices and mapped to corresponding sub arrays, and each sub matrix scaled to make use of the whole available range available on the hardware and reduce the effect of outliers. After the matrix vector multiplication computation has been performed, the values in each sub array will need to be scaled by the reciprocal of the total scaling performed on each sub array before calculating the output vector by summing across sub arrays. In this way, the method provides the advantage reducing the number bits required for the calculation and improved compression of the matrix weights, as well as a significant improvement to accuracy of the result, while being implemented on an analog circuit. In an example, the matrix comprises neural network weights.

In an example, the method may be implemented on a compute-in-memory matrix multiplier for multiplying a matrix with a vector, comprising: an array comprising a plurality of sub arrays, each sub array having rows and groups of columns of storage cells, each sub array storing values of a sub matrix of the matrix in the storage cells, wherein each element of the matrix is stored in a row across a group of columns, each column of the group of columns associated with a bit value of an element of the sub matrix, wherein each sub array is associated with a scale; wherein the compute-in-memory matrix multiplier is configured to: perform a first operation comprising: for each sub array, obtain a dot product of each column with at least a portion of the vector; subsequent to performing the first operation, perform a second operation comprising any one of two options, wherein the two options are: for each group of columns for each sub array, obtain a weighted sum of the group of columns according to the associated bit value for each column of the group of columns; and multiply each sub array with the scale associated with the sub array and obtain a sum of columns of the scaled sub arrays corresponding to a column of the matrix; subsequent to performing the second operation, perform a third operation, wherein the third operation comprises performing the other one of the two options.

In an example, the array comprises multiple rows of sub arrays and/or multiple columns of sub arrays. In an example, when the array comprises multiple columns of sub arrays, a sum of the scaled dot products is obtained for each column of the multiple columns of sub arrays, and the vector result of the matrix multiplication is obtained by concatenating the obtained sums of the scaled dot products.

In an example, the scale associated with each sub array is determined based on a scale used to store each sub matrix of the matrix in the array. In an example, each sub matrix may be scaled before storing in the sub array, such that the range of the weights of the sub matrix corresponds to the range of values available in the sub array. In an example, a further scaling may be applied such that the further scaling is applied to all sub matrices in the same row, wherein the further scaling is also dependent on the one or more corresponding vector values to be applied to these sub matrices. In an example, each sub matrix may be scaled before storing in the sub array into different bit representations. In an example, the scale associated with each sub array is the inverse of the accumulated scaling performed on the weights of the matrix stored in the sub array.

In an example, by performing the scaling on the matrix weights before storing in the array, and then applying the scaling associated with sub array after performing the multiplication, the full range available in the compute-in-matrix array is utilised in the multiplication, while fulfilling the need to keep within the limits of the hardware. This improves accuracy of the result of the matrix multiplication as well as reducing the number of bits required and the compression level required to represent the matrix weights stored in the array, by maximising the range of weight values that are used in a sub matrix. To illustrate this, for example, if all weights in a sub matrix are such that their maximum value is less than a quarter of the supported maximum range of the hardware, then multiplying all the values of that sub matrix by 4 means that more of the available range will be used.

In an example, a sub matrix stored in a sub array may be further divided into sub matrices stored in sub arrays. In an example, each sub matrix may be further divided any number of times. In an example, the matrix may be divided into sub matrices that are different dimensions, and stored in sub arrays that correspond to the sub matrices of different dimensions.

In an example, the matrix is stored in the array in floating point format. Where there is a matrix of floating point numbers, such as 32 bit floating point numbers, it is possible to convert the matrix to a more compact digital format for more efficient computation in a digital computing device. Converting a matrix of floating point numbers to a more compact digital format typically results in degradation since some information is lost when converting to the more compact digital form. Various different mappings are available for converting from floating point number format to digital format and typically these comprise mapping the range of floating point numbers in the matrix to a specified bit precision range and using coefficients to scale the bits. In an example, a floating point number is mapped to a binary number with two levels of bit precision: a most significant bit (MSB) and a least significant bit (LSB) and the bits are scaled using coefficients which are powers of two.

Thus there is provided a flexible array that can be optimised for specific weight matrices based on the particular matrix multiplication being implemented.

Accuracy of the matrix-vector multiplication, and therefore of the neural network, may depend on the size of the sub arrays. The smaller the sub arrays, the higher the accuracy retained in the neural network mapped onto the array.

To illustrate, one consideration is outliers in the weights of the matrix. Consider a large matrix where all floating-point values are between [−1 and 1] except for one outlier, at −4. If this whole matrix is mapped to the INT5 range (INT5 weight encoding may be used to represent the integers [−16 to 15]), then most of the values, which are the [−1 to 1] values, would be effectively mapped only to around the INT3 encoding range of [−4 to 4] despite mapping the matrix to INT5 range, because of the single outlier at −4 needing to also be represented on the same scale as the rest of the matrix. Instead, the matrix may be mapped by dividing the matrix into groups such that, for example, a 4-bit UINT scale (0 to 15) is used for each group of 4 or 8 or 16 elements, and wherein the outlier value is placed in a group that has a maximal group scale (e.g. 15) associated with it while other groups have smaller scales. Thus the matrix may be mapped such that all the weights of the matrix benefits from leveraging the full range [−16 to 15] of the INT5 base representation, instead of just the outliers leveraging the full range.

In an example, the minimum number of rows for a group is restricted by the need to be able to encode the scaling factor in the number of rows afforded by the sub array size in the array circuit. In an example, the minimum number of rows for a group is a power of 2. In a specific example, in a group to be mapped using a 4-bit UINT4 scale (0 to 15), (8, 4, 2, 1) capacitors are needed and thus requires at least 8 rows in the group.

In an example, the number of columns for a group is predetermined or is determined when dividing the matrix into groups. In an example, the number of columns for a group is N, wherein an N-bit UINT scale is used to map the group to a sub array of the array circuit.

In an example, the groups are scaled in a block floating point format, wherein the scale values are 1, 2, . . . , $2^{N-1}$, wherein N is the number of columns and an N-bit UINT scale is used to map the group to a sub array of the array circuit.

To encode each $W_{i,j}$ in binary, as a simple example, encode it in two bits, call these two bits Most Significant Bit (MSB) and Least Significant Bit (LSB). In an example, the calculation for element of matrix vector multiplication may now be expressed as $X_0(1 \cdot W_{0,0,LSB}+2 \cdot W_{0,0,MSB})+X_1(1 \cdot W_{1,0,LSB}+2 \cdot W_{1,0,MSB})$, where each $W_{i,j,LSB}$ and $W_{i,j,MSB}$ are binary variables. To encode the weights with more than 2 bits, there are multiple bits of different significance. Denote significance of a bit with 0, 1, 2, . . . , so the general form of the matrix vector multiplication may be expressed as: $(X_0 \cdot W_{0,0,0} \cdot 2^0 + X_0 \cdot W_{0,0,1} \cdot 2^1 + X_0 \cdot W_{0,0,2} \cdot 2^2 + \ldots) + (X_1 \cdot W_{1,0,0} \cdot 2^0 + X_1 \cdot W_{1,0,1} \cdot 2^1 + X_1 \cdot W_{1,0,2} \cdot 2^2 + \ldots)$.

In other words, where Y is a vector and the result of matrix vector multiplication W·X:

$$Y_j = \sum_i X_i W_{i,j}$$

When W is decomposed into a multi-bit value, $W_{i,j} = \Sigma_k W_{i,j,k} 2^k$, wherein each $W_{i,j,k}$ is a binary digit, in other words, each $W_{i,j,k}$ is a 1 or a 0.

Figure 1B:
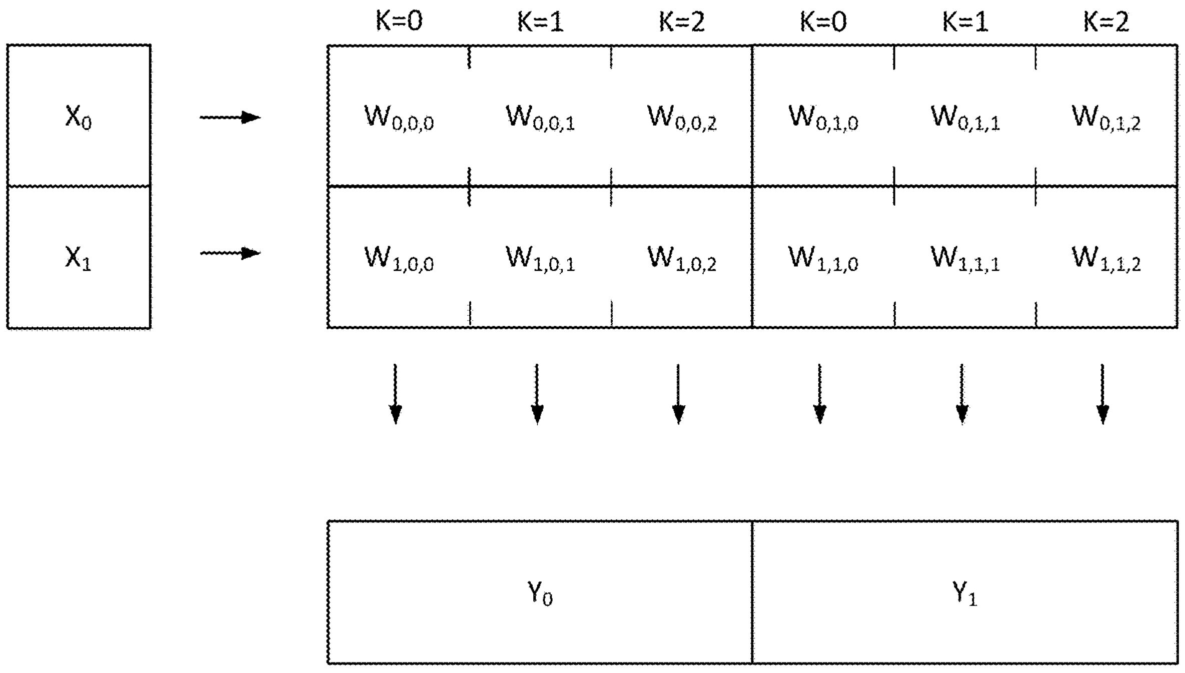

The order of summation may be changed, such as to $Y_j = \Sigma_i X_i \Sigma_k W_{i,j,k} 2^k = \Sigma_i \Sigma_k X_i W_{i,j,k} 2^k = \Sigma_k \Sigma_i X_i W_{i,j,k} 2^k = \Sigma_k 2^k \Sigma_i X_i W_{i,j,k}$ FIG. 1B shows schematically an example of the matrix of FIG. 1A after being converted from floating point number format to a 3 bit precision. In this example, the matrix is size (2,2) and the vector has 2 values. In this example, it is seen that each matrix value is represented with 3 bit precision. Each cell stores one of the bit precisions of one of the values. In other words, a single floating point weight from the matrix in FIG. 1A is represented by three bits in a row. Note that the terms row and column are interchangeable since by rotating a matrix a row becomes a column. In an example, one or more rows are duplicated such that the total number of rows in the circuit is at least $2^{n-1}$, where n is the highest bit significance value used in the bit precision format for the matrix values.

In an example implementation, the following method may be carried out to multiply a first value from a vector with the stack of matrices. In an example, the method may be carried out as now explained.

The matrix and array are divided into sub matrices and corresponding sub arrays. In an example, the matrix comprises neural network weights. The values of the weights of the matrix are converted into bit precision and stored into storage units of cells of the sub arrays. In an example there is one cell for each bit precision of each weight.

For each weight, connect the cells of each bit precision of the weight together to form a weight row. Apply a voltage representing a value in an entry of the vector to the weight row. Do the same for each voltage and weight row.

In each sub array, update the connections between the cells such that cells representing the same bit precision are connected.

In each sub array, update the connections between the cells such that the cells representing the bit precisions are weighted according to the first bit precision.

Connect the sub arrays and read off the answer.

In an example, the connections between the cells are updated such that the cells representing the bit precisions are scaled according to the first bit precision before the sub arrays are connected. In an example, the cells of the same bit precision across sub arrays are connected before the connections between cells are updated such that the cells representing the bit precisions are weighted.

In an example, connecting the sub arrays comprises configuring the switches in the sub arrays such that coefficients of combination of the sub arrays are implemented.

In an example, cells of the array may be programmed to define groups of columns for each based on the weight sizes used in the application. In this example, it may be possible to partition the groups to a common scale factor and individual weights that are smaller than the column group size. In this case, the preferred weight sizes may depend on the actual weight values of the matrix. In an example, the cells used are AND cells, described in relation to FIG. 5.

In an example, cells of the array may be programmed to segment the columns in a sub array, the segments being determined by the weights needed, which in turn depend on the weight wordlength. In a normal binary example in which there are n-bit weights, the columns will be partitioned into sections with relative lengths of 1, 2, 4, . . . , $2^{n-1}$. In an example, the cells used are OR cells.

In an example, the array comprises cells that allow joining of sub arrays either by summing or averaging (i.e. stacking or shorting of sub arrays). The programming for the cells of the array is determined by the need to balance the requirements for signals not to become too small or to large. The choice of whether to stack or short sub arrays therefore depends on the likely signal levels, which also depends on the values in a particular matrix. In an example, both AND and OR cells are used.

Figure 2A:
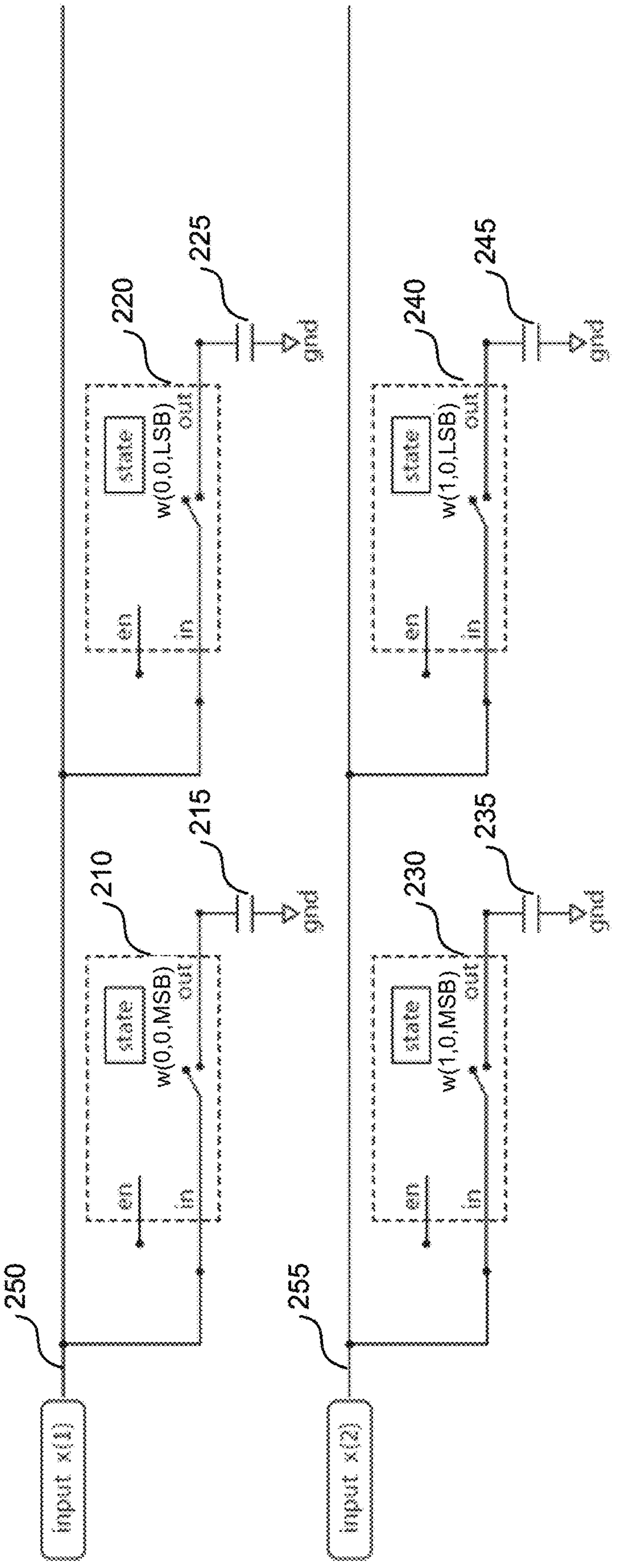
FIG. 2A-2D are circuit diagrams of an example hardware implementation of matrix vector multiplication.

FIG. 2A illustrates an example hardware implementation of for calculating W·X, where X is a vector with two elements and a first column of the matrix W of size (2,2), as described in relation to FIG. 1B. The result is proportional to the first element of the result vector Y. The multiplication is performed in an array of cells, wherein each cell comprises a capacitor, binary storage, and at least one switch. In an example, each cell 210, 220, 230, 240 is connected to a data input line and a data output line that can be connected to each other by at least one switching element, and an enable input line. In FIG. 2A, cells 210 and 220 are connected via the data input line 250, and cells 230 and 240 are connected via the data input line 255. As described in more detail below, voltages corresponding to the vector X are provided to the cells via the data input lines 250 and 255, each cell outputs to the capacitor 215, 225, 235, 245 via the data output line and an activation signal for activating cells is provided via the enable line.

A weight of the matrix W is stored in the binary storage element of the cell. In an example, the binary storage element stores the weight as an 'active' state or an 'inactive' state. In an example, the binary storage element stores a 1 or a 0. When the enable input is 'active' and the stored state in the binary storage is 'active', a conductive path between the data input and data output in the cell is formed by closing a switch. If either the stored state or the enable input is inactive then the switch is opened and the conductive path from data input to data output is broken. The data inputs are connected together along rows by a data input line, and each row i is driven by an input, x(i), provided via the data input line. Each cell 210, 220, 230, 240 has an associated capacitor 215, 225, 235, 245, and each cell connects or disconnects its capacitor by opening or closing the switch to the data output based on its stored state and the enable input as previously described.

In an example, each bit representation of the matrix W are stored a binary storage element of a cell, where bit representations of the first column of the matrix are stored in the first column of cells, and the bit representations of the second column of the matrix are stored in the second column of cells. In an example, as illustrated in FIGS. 1B and 2A, each weight of the matrix is stored across a group of columns of cells in a row, such that each weight of the first column of the matrix are stored across a first group of columns of cells and each weight of the second column of the matrix is stored across a second group of columns of cells. In the example of FIG. 2A, each weight is stored across a first group of columns of cells, the first group of columns of cells comprising a first column and a second column, wherein the first and second columns represent different bit significances.

In an example, such as in FIG. 2A, the first column of cells 210, 230 represents a most significant bit and the second column of cells 220, 240 represents a least significant value of the weight to be stored in the array. In an example, the binary storage element is a SRAM. The values of the vector are applied to the corresponding row of cells as a voltage. When the voltage is applied, charge is stored in a capacitor in each cell, wherein each capacitor stores a charge which represents the corresponding calculation of $W_{i,j,MSB}$·X or $W_{i,j,LSB}\cdot X_i$.

In an example, each bit representation of the matrix W are stored in a group of binary storage elements, wherein the group of binary storage elements are in cells that are in different rows and in the same column of the array of cells, or the group of binary storage elements are in cells that are in different columns and in the same row of the array of cells. Each bit representation may be stored in a binary storage element using conventional techniques known to the skilled person. For example, the array of cells comprises memory access bit lines and memory access nbit lines parallel to each column of cells and memory access word lines parallel to each row of cells, wherein all the memory access bit lines are pre-charged to a high state. In an example write operation, to store or write matrix weights into a cell, the memory access bit line voltage or the memory access nbit line voltage (depending on the value to be written) is driven low just for the column or columns in in which the cell is located, then the memory access word line controlling the row in which the cell is located is pulsed high for long enough to write the data into the cell.

To read from the memory, the array of cells comprises memory access bit lines and memory access nbit lines parallel to each column of cells and word lines parallel to each row of cells, wherein all the memory access bit lines and memory access nbit lines are pre-charged to a high state. The memory access bit lines and the memory access nbit lines for the column in which the cell is located are pulled high, while all the memory access word lines are held low to pre-charge the lines, then the memory access word line controlling the row in which the cell is located is pulled high. This connects all of the cells in that row to the associated memory access bit lines and each cell in the row therefore starts to pull one of the memory access bit line or memory access nbit line, depending on the stored data, low. Once a sufficient voltage difference has developed between the memory access bit line and the memory access nbit line, the voltage difference is measured and converted into a logical high or low.

The capacitor in a cell may be implemented as a single capacitor of appropriate size, or as a group of capacitors. In an example, when the capacitor in a cell is implemented as a group of capacitors, the group of capacitors may comprise capacitors that are all of the same size.

Figure 2B:
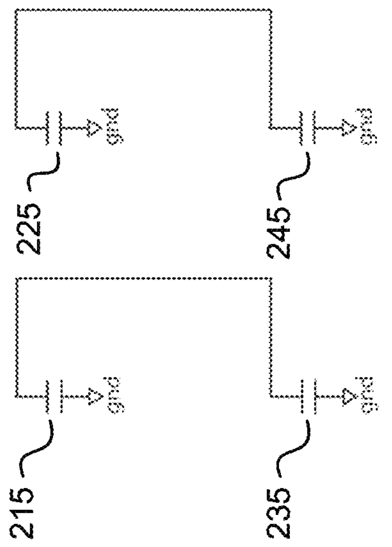

Referring now to FIG. 2B, when the charge is stored in the capacitors 215, 225, 235, 245, the cells in each row are disconnected from each other, then the cells in each column are connected together, as described in relation to FIG. 1B. FIG. 2B is a simplified figure showing only the capacitors 215, 225, 235, 245 of the cells 210, 220, 230, 240. In FIG. 2B, capacitors 215 and 235 are connected to each other, and disconnected from capacitors 225 and 245, wherein capacitors 225 and 245 are connected to each other. The capacitors in each column store charge corresponding to bit weights of the same bit significance. This allows the charge on the capacitors to redistribute so that the voltage on each capacitor in a column is the same and is equal to the average of the voltages that were previously stored on the capacitors. In an example, cells are connected and disconnected by switches. When the cells in each column are connected together, the charge values stored in the capacitors are combined, with each capacitor in a column storing the same charge, being proportional to $X_0\cdot W_{0,0,MSB}+X_1\cdot W_{1,0,MSB}$ or $X_0\cdot W_{0,0,LSB}+X_1\cdot W_{1,0,LSB}$ respectively, or can be mathematically represented as $Y_{j,k}=\Sigma_i X_iW_{i,j,k}$, where Y is the matrix vector multiplication result of X and W, i is the row number, j is the column number, and k is the bit significance.

Figure 2C:
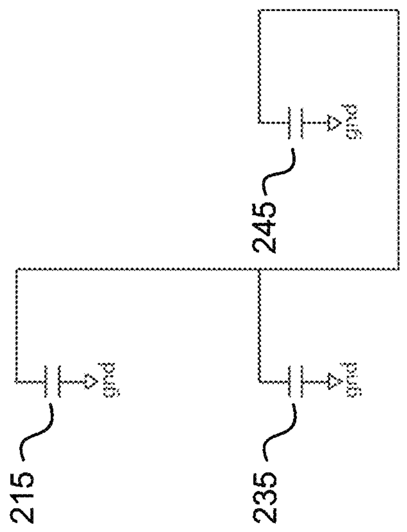

Referring now to FIG. 2C, the cells of the columns are connected together, such that the number of capacitors connected corresponds to the weighting of the bit representations corresponding to the columns, as described in relation to FIG. 1*b*. In other words, all the columns corresponding to the bit representations of an element of the matrix are connected together. In this example, the value of the MSB is twice that of the LSB, thus twice as many cells of the MSB column are combined with the cells of the LSB, i.e. capacitors 215, 235 and 245 are connected and capacitor 225 is disconnected (and not shown). In other words, two cells of the MSB column are combined with one cell of the LSB, which represents $2(x_1\cdot w_{1,1,MSB}+x_2\cdot w_{2,1,MSB})+1(x_1\cdot w_{1,1,LSB}+x_2\cdot w_{2,1,LSB})$. Mathematically, this may be represented as $Y_j=\Sigma_k 2_k \Sigma_i X_i W_{i,j,k}$, where Y is the matrix vector multiplication result of X and W, i is the row number, j is the column number, and k is the bit significance. In this way, the charges of the connected capacitors are combined to give an overall charge proportional to an element of the result of the matrix-vector multiplication W·X.

The above is a non-limiting example, serving to illustrate the process of the matrix-vector multiplication implemented in a circuit. In another example, X is a vector with more than two elements, and/or W is a matrix with more rows and columns. In another example, each $W_{i,j}$ is encoded into more than two bits. In an example, the matrix has more than one row, and the values are encoded such that each row is encoded into a different number of bits.

Figure 2D:
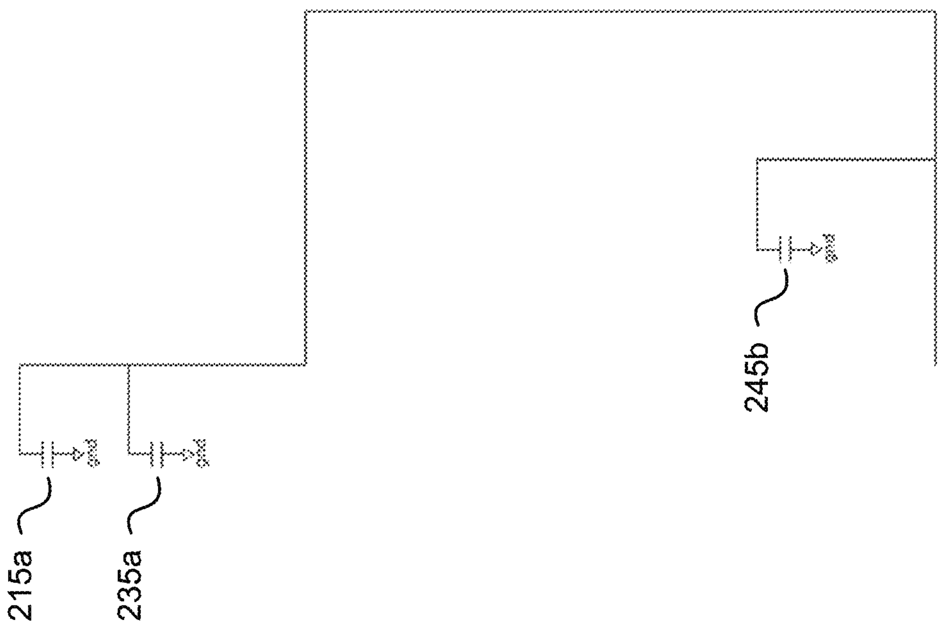

Referring now to FIG. 2D, the cells of two sub arrays are connected together, as described in relation to FIG. 1B. In an example, each sub array in FIG. 2D is the sub array illustrated in FIG. 2A. In an example, more than two sub arrays are connected together. In an example, switches are used to selectively enable and disable connections between the sub arrays. In an example, additional copies of the cells are used to selectively enable and disable connections between sub arrays. In FIG. 2D, two capacitors 215*a* and 235*a* from the first sub array are combined with one capacitor 245*b* from the second sub array, so that there is a 2:1 relative weighting between the two sub arrays. FIG. 2D is an example, and sub arrays may have alternative weightings. In another example, three capacitors from the first group can be combined with one capacitor from the second group to give a 3:1 weighting. In another example, using two capacitors from the first group and three capacitors from the second group gives a 2:3 weighting. In an example, more than two sub arrays may be connected, with the number of capacitors from each sub array that are connected being proportional to the weighting of between the sub arrays. This provides a way of implementing the weighted sum of partial results as a useful technique that enables using reduced weight precision in parts of a sum-of-products calculation. Thus the capacitances are manipulated to be equivalent to the weighted sum of partial results. The partial results are combined with a relative weighting applied, in other words the final voltage is a weighted average of the partial or intermediate results that are themselves weighted averages of inputs. The partial results are produced as described in relation to FIG. 2C. The voltage can be observed on the node connecting the cells together, for instance using an amplifier as a buffering circuit.

In an example, the result of the matrix vector multiplication is obtained from the weighted sum of partial results. In an example, each weighted sum provides corresponds to an element of the vector result. In an example, each weighted sum is proportional to an element of the vector result. In an example, all weighted sums of partial results are proportional to the vector result with the same scale. In an example, one or more of the weighted sums are proportional to the vector result with a different scale.

While the preceding description describes connecting the cells of a group of columns together to calculate a weighted sum of across a group of columns, as in FIG. 2C, before connecting cells of sub arrays together to calculate a weighted sum of partial results, as in FIG. 2D, there is the alternative of performing the operations shown in FIG. 2D before performing the operations shown in FIG. 2C. In other words, in an alternative, the cells of the sub arrays down a column are connected, and then the cells of a group of columns are connected across a part of a row.

When the columns, rows or sub arrays are combined, the preceding figures illustrate the capacitors connected in parallel to obtain a capacitive average. In another example, the capacitors may be connected in series to obtain a capacitive sum. In another example, a combination of capacitive averaging and capacitive summing may be used.

When using averaging, signal magnitude does not increase, so it is important to ensure that the signal level does not become too low to be indistinguishable from noise. This is particularly important when averaging over large numbers of values, as it will become likely that there are some signal values that will reduce the output signal level compared to the input signal level.

Figure 3A:
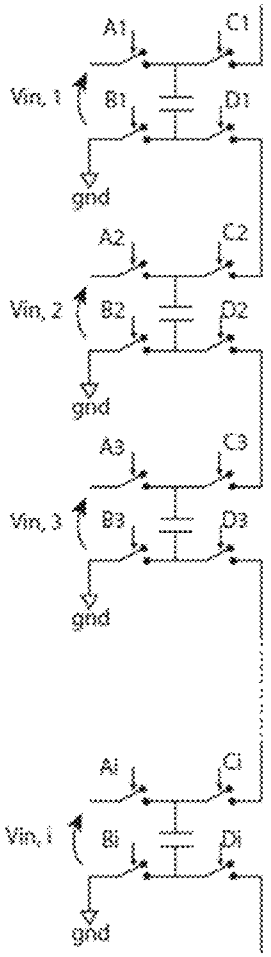
FIG. 3A-3D are circuit diagrams of an example hardware implementation of performing summing and averaging in matrix vector multiplication.
Figure 3B:
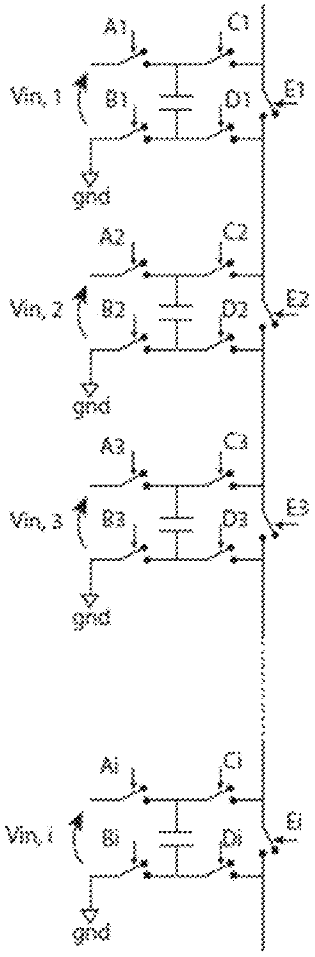
Figure 3C:
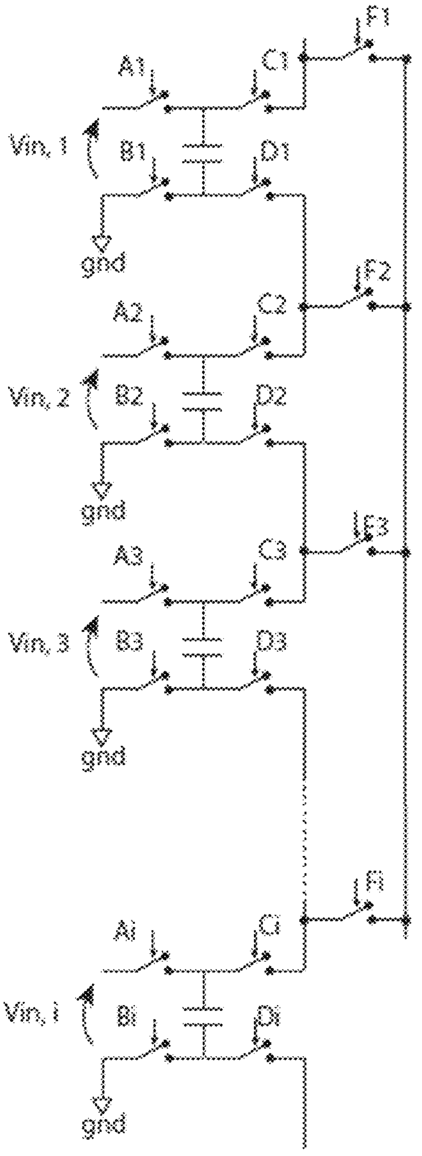
Figure 3D:
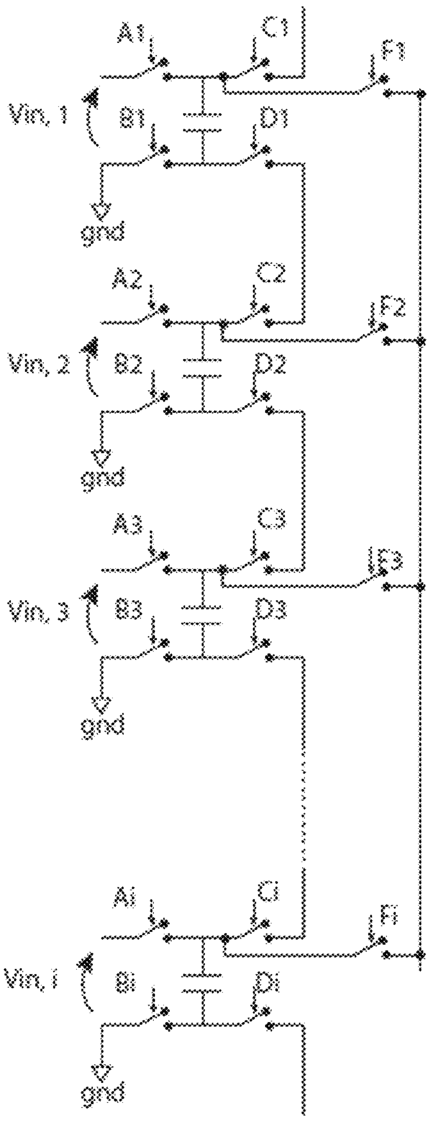

It is possible to avoid the loss of signal magnitude by performing a capacitive sum rather than average, as in FIG. 3A. Using a capacitive sum is not possible when the final voltage significantly exceeds the supply voltage. Thus it is desirable for the circuit to perform a combination of summing and averaging. FIGS. 3B-3D show variations of circuits that can perform both summing and averaging.

FIG. 3A, shows a column of repeated units, with each unit consisting of a capacitor and four switches labelled A, B, C, and D. Each unit has 2 inputs (each connecting to one of the switches A and B) and two outputs (each connecting to one of the switches C and D). Switches A and C are in series with each other, and switches B and D are in series with each other. A capacitor is positioned so that it is placed with a connection between switches A and C, and a connection between switches B and D. Input voltages (Vin) are applied to the inputs of each unit. In an example, the input voltages Vin applied to the inputs are a differential signal. In an example, the input connected to switch B is connected to ground. The circuit is operated as follows:

Switches C and D are disconnected, and switches A and B are connected. The capacitors are therefore connected to the input voltages Vin and are therefore charged to the input voltages Vin.

Switches A and B are disconnected. The capacitors retain the input voltages.

Switches C and D are connected. This connects the capacitors in series, so that the voltage across the stack of capacitors is equal to the sum of the voltages across each capacitor, and therefore to the sum of the original input voltages.

FIG. 3B illustrates the circuit of FIG. 3A with another switch, E, between the switches C and D. The operation of this circuit, including summing, works in the same way as with FIG. 3A. Additionally, to average voltages loaded into the circuit, switches A and D must be opened, and B, C and E must be closed.

FIGS. 3C and 3D illustrate alternative circuits to the circuit of FIG. 3B for implementing the averaging function. In both of them an extra switch (F) is added to connect a group of individual units to a shared averaging wire. In FIG. 3C averaging is performed by opening switches A and D, and closing B, C, and F. In FIG. 3D averaging is performed by opening A and D, and closing B and F. In the circuit of 3D, C can be either open or closed.

In all of FIGS. 3A-3D the switch C can be omitted, and the circuit will still work as described. All of the circuits in FIG. 3 can be used with bit cells described in relation to FIGS. 5, 6 and 7A, wherein switch A is controlled by the enable signal and the stored state. An example implementation of the cell of FIG. 7A in the circuit of FIG. 3A is shown in FIGS. 7B and 7C. In FIG. 7B, the two capacitors in series are illustrated. As two capacitors in series are equivalent to a single smaller capacitor, alternatively a single capacitor could be used and connected to the other cell. FIG. 7C illustrates an example with the two capacitors in parallel. As two capacitors in parallel are equivalent to a single larger capacitor, alternatively a single capacitor could be used and connected to the other cell. An example implementation of the cell of FIG. 7A in the circuit of FIG. 3B is shown in FIG. 7D. In the example of FIG. 7D, the switch C is omitted.

Figure 4A:
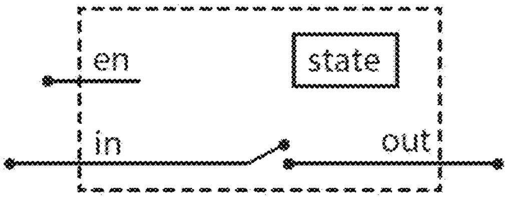
FIG. 4A-4C are circuit diagrams of examples of cells.

FIG. 4A illustrates an example of a cell. The cell has a data input line, an enable line and a data output line. The data output line is connected to a capacitor, wherein the capacitor is also connected to ground. The cell further comprises binary storage element. In an example, a neural network weight can be stored in the binary storage element as a bit representation. In an example, a neural network weight can be stored in multiple binary storage elements as bit representations. In an example, the state stored in the binary storage element is the value stored in the binary storage element. In an example, the value stored in the binary storage element (i.e. the stored state) is active or inactive. When the cell is symmetrical, such as in FIG. 4C, the difference between the two stored states is not related to the structure of the cell, whereas the two states is related to the structure of the cell in asymmetric cells such as in FIGS. 5C and 5D. The cell further comprises at least one switch, which closes to connect the data input line with the data output line when the enable line is active and there is a value stored in the binary storage element. The at least one switch is a passive element, meaning that signals can pass through them in either direction. The position of the data input line and the data output line are interchangeable, and should not be construed as requiring a particular direction of signal flow through the cell.

Figure 4B:
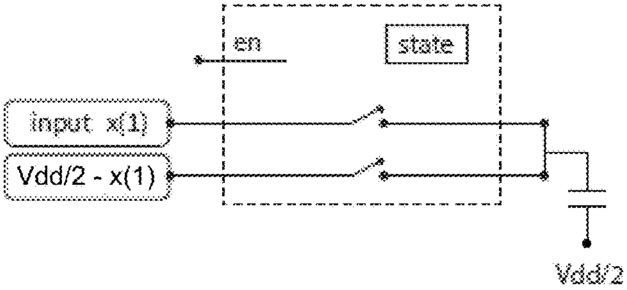
Figure 4C:
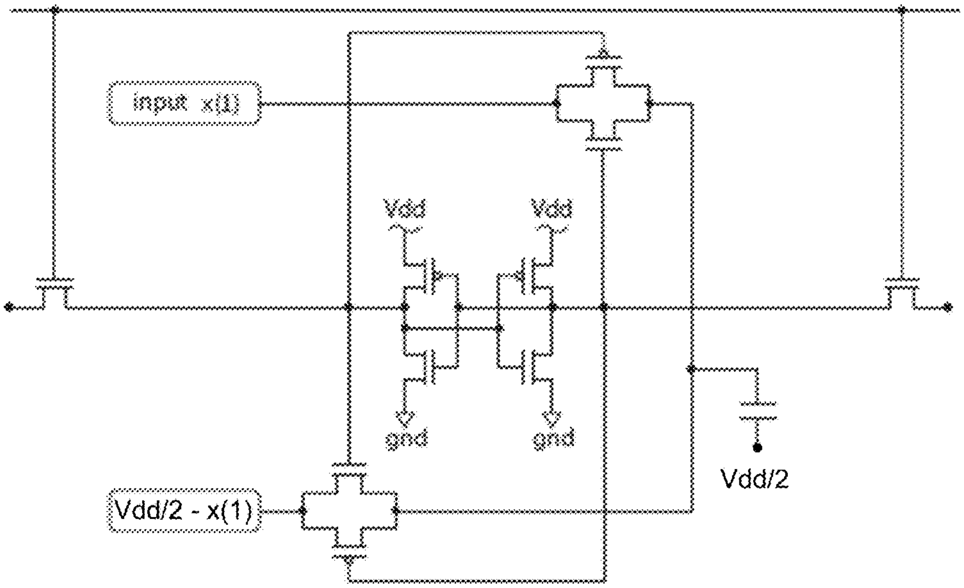

In an example, the cell further comprises a second data input line, as illustrated in FIG. 4B. In an example, the two data input lines are connected to related signals. The original input signal is offset by a voltage so that the current input signal in the two data input lines can go up for positive inputs and down for negative inputs. In an example, a first data input line is connected to the original input signal offset by half the supply voltage (e.g. 0.5Vdd+original data input voltage) and a second data input line is connected to a derived signal of the original input signal subtracted from half the supply voltage (e.g. 0.5Vdd–original data input signal voltage). In this example, the offset is set to half the supply voltage Vdd. The offset is set to half the supply voltage when, for example, it is assumed that the input voltages cover a range that is symmetrical about 0, i.e. that the magnitudes of the most positive and most negative values are approximately equal. In an example, in a cell with two data input lines, the binary storage element stores a bit representing +1 or −1. By having two data input lines, in which one line gives a positive weighted input (e.g. by addition with 0.5Vdd) and the other line gives a negative weighted input (e.g. by subtraction from 0.5Vdd), it is possible to select a positive (+1) or negative (−1) bit to be stored in the binary storage element. In an example, neither data input is connected to the data output when the enable input is inactive. In an example, the first data input is connected when the enable line is active and the stored state is active. In an example, the second data input is connected when the enable line Is active and the stored state is inactive. In an example, the voltage that is stored in the capacitor of the cell connected to the data output is the input voltage multiplied by either +1 or −1. The use of positive and negative versions of the input, offset relative to half the supply voltage, is useful for computing results with both positive and negative weights. The cell with two data input lines may be implemented in a circuit as illustrated in FIG. 4C. In FIG. 4C, the implementation is based on a 6-transistor SRAM cell.

FIGS. 5A-5D illustrate possible variations of cells. These cells may be referred to as AND cells because the data input line and the data output line are connected when the enable signal and the stored state are both active. AND cells may used for initialisation of the array, for controlling connections between columns, and for controlling connections between subarrays when doing capacitor stacking (i.e. summing capacitor charges). In FIGS. 5A-5D, the position of the data input line and the data output line are interchangeable, and should not be construed as requiring a particular direction of signal flow through the cell.

In an example, AND cells allow parts of a group of cells to be set to zero, which can be used to reduce the stored voltage level in parts of the array. In an example, AND cells can be used to clear or reset the array before starting a matrix vector multiplication. In an example, AND cells define regions of the array that can be permanently separated by programming of the AND cells or temporarily separated via external control. In an example, the sub arrays are temporarily joined by a control unit.

In an example, the control unit is configured to activate control lines of the array in order to store values of the neural network weights converted into a bit precision format into storage units of cells of the sub arrays. In an example, the control unit is configured to trigger one or more of the switches for each weight in each sub array, to connect cells of each bit precision of the weight together to form a weight row, and to trigger application of a voltage representing a value in an entry of the vector to the weight row, and do the same for each voltage and weight row. In an example, the control unit is configured to trigger one or more of the switches to update the connections between the cells in each sub array such that cells in each sub array representing the same bit precision are connected. In an example, the control unit is configured to trigger one or more of the switches to update the connections between the cells in each sub array such that the cells in each sub array representing the bit precisions are scaled according to the first bit precision format. In an example, the control unit is configured to trigger one or more of the switches to connect the sub arrays and output a capacitance of a capacitor of a connected cell.

In an example, AND cells are used to partition rows of cells to perform the weighting of across columns within a sub array as described in relation to FIGS. 2B and 2C. The AND cells are used to connect or disconnect the rows of capacitors. For example, for temporary separation, turning to FIGS. 2B and 2C, the AND cells are used to disconnect capacitors 215 and 225 from each other and capacitors 235 and 245 from each other in FIG. 2B, and to connect capacitor 245 to capacitors 215 and 235 in FIG. 2C. In an example, capacitors 235 and 245 are connected to each other using external control, and capacitors 235 and 245 are disconnected from each other by removing the external control.

In another example, AND cells are programmed to permanently separate regions of the array, which comprises defining regions of the array that are connected together to obtain the weighted average across columns. In an example, the region defined by AND cells is a group of columns used to store a weight (e.g. if the matrix comprises 4 bit weights, then the AND cells are programmed to break the rows of the array every 4 columns). In an example, the region defined by AND cells is a sub array of cells comprising multiple groups of columns used to store a weight.

Figure 5A:
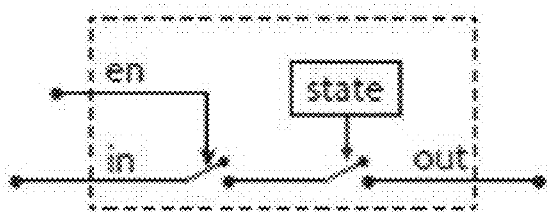
FIG. 5A-5D are circuit diagrams of examples of AND cells.
Figure 5B:
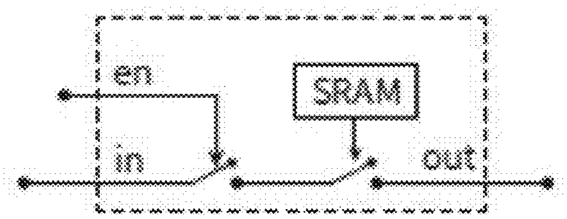

In an example, as illustrated in FIG. 5A, the cell comprises two separate switches arranged in series, wherein a first switch is controlled by an enable signal via the enable line and a second switch is controlled by the stored state. In an example, as illustrated in FIG. 5B, the stored state is provided by an SRAM.

Figure 5C:
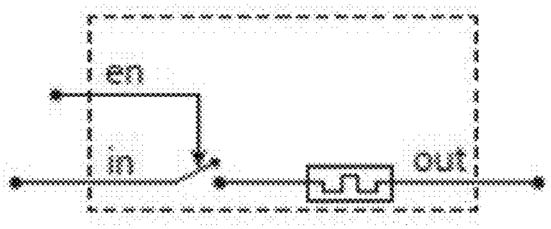

In an example, as illustrated in FIG. 5C, the cell comprises the first switch controlled by the enable signal, and a programmable resistive element for the storage cell, wherein the programmable resistive element is in series with the switch controlled by the enable signal. The programmable resistive element also functions as the second switch controlled by the stored state. The programmable resistive element may be set to a very high resistance or low resistance, such that the data input line is connected to the data output line when the resistance is low, and the data input line is not connected to the data output line when the resistance is very high. In an example, the programmable resistive element is a RRAM cell.

Figure 5D:
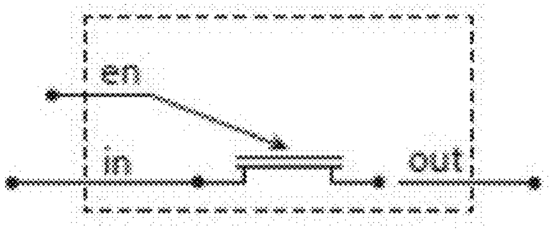

In an example, as illustrated in FIG. 5D, the cell comprises a transistor, wherein the transistor is used as the binary storage element and as the first switch controlled by the enable signal and as the second switch controlled by the stored state. In an example, the transistor is a transistor with a programmable threshold voltage. In an example, the transistor is a flash transistor. In an example, if the gate voltage of the transistor (i.e. the enable signal) is low, then the transistor is turned off and there is no connection between the data input line and the data output line. In an example, if the gate voltage is high and the transistor is programmed to a low transistor threshold voltage state, then the transistor is turned on and the data input line and the data output line are connected. In an example, if the gate voltage is high and the transistor is programmed to a high transistor threshold voltage state then the transistor is turned off and the data input line and data output line are not connected.

FIGS. 6A-6E illustrate possible variations of cells. These cells may be referred to as OR cells because the data input line and the data output line are connected when either the enable signal or the stored state are active. OR cells may be used to partition columns within subarrays to perform weighting when combining groups of capacitors with averaging, and for connections between sub arrays when doing averaging between sub arrays. In FIGS. 6A-6E, the position of the data input line and the data output line are interchangeable, and should not be construed as requiring a particular direction of signal flow through the cell.

In an example, OR cells separate sub-arrays within the array of cells. These sub arrays may either be permanently joined (by programming), or temporarily joined by external control. In an example, the sub arrays are temporarily joined by a control unit. The OR cells make the array of cells programmable whether to perform a summing or averaging operation when combining groups of capacitors of cells for the calculation.

In an example, the control unit is configured to activate control lines of the array in order to store values of the neural network weights converted into a bit precision format into storage units of cells of the sub arrays. In an example, the control unit is configured to trigger one or more of the switches for each weight in each sub array, to connect cells of each bit precision of the weight together to form a weight row, and to trigger application of a voltage representing a value in an entry of the vector to the weight row, and do the same for each voltage and weight row. In an example, the control unit is configured to trigger one or more of the switches to update the connections between the cells in each sub array such that cells in each sub array representing the same bit precision are connected. In an example, the control unit is configured to trigger one or more of the switches to update the connections between the cells in each sub array such that the cells in each sub array representing the bit precisions are scaled according to the first bit precision format. In an example, the control unit is configured to trigger one or more of the switches to connect the sub arrays and output a capacitance of a capacitor of a connected cell In an example, OR cells are used to partition columns of cells to perform the weighting of different columns within a sub array as described in relation to FIGS. 2B and 2C. The OR cells are used to connect or disconnect the columns of capacitors. For example, turning to FIGS. 2B and 2C, the OR cells are used to connect capacitors 225 and 245 in FIG. 2B, and to disconnect capacitors 225 and 245 in FIG. 2C. In an example, capacitors 225 and 245 are connected to each other using external control, and capacitors 225 and 245 are disconnected from each other by removing the external control. OR cells may be used in this way to perform averaging along a portion of a column. The array may comprise OR cells at each end of every potential portion of column that may be used i.e. at each potential break in the column.

Figure 6A:
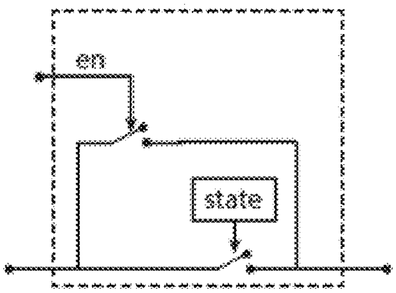
FIG. 6A-6E are circuit diagrams of examples of OR cells.
Figure 6B:
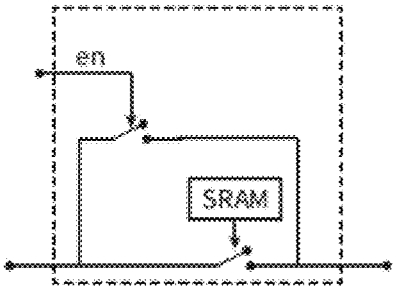

In an example, as illustrated in FIG. 6A, the cell comprises two parallel switches, a first switch controlled by the enable input and a second switch controlled by the stored state. In an example, as illustrated in FIG. 6B, the stored state is provided by an SRAM bit cell.

Figure 6C:
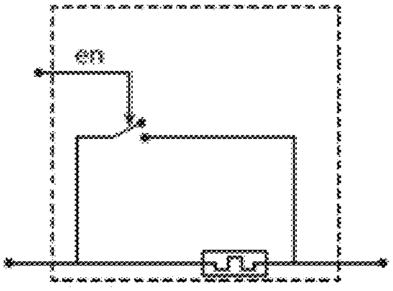

In an example, as illustrated by FIG. 6C, the cell comprises the first switch controlled by the enable signal, and a programmable resistive element for the storage cell, wherein the programmable resistive element is in series with the switch controlled by the enable signal. The programmable resistive element also functions as the second switch controlled by the stored state. The programmable resistive element may be set to a very high resistance or low resistance, such that the data input line is connected to the data output line when the resistance is low, and the data input line is not connected to the data output line when the resistance is very high. In an example, the programmable resistive element is a RRAM cell.

Figure 6D:
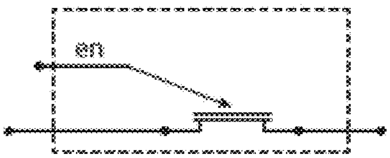

In an example, as illustrated by FIG. 6D, the cell comprises a transistor, wherein the transistor is used as the binary storage element and as both the first switch controlled by the enable signal and the second switch controlled by the stored state. In an example, the transistor is a transistor with a programmable threshold voltage. In an example, the transistor is a flash transistor. In an example, the transistor threshold voltage is programmed to either a very low value, approximately zero, or a higher value intermediate between zero and the supply voltage. The very low value is used as the 'active' state of the storage cell, and the higher one as the 'inactive' state of the storage cell. The enable signal is connected to the gate, and is set to either a value close to Vdd, or a value that is below the voltage used as the 'inactive' threshold for the transistor but above the voltage used as the 'active' threshold. The high value is used as the 'active' state of the enable signal, and the lower value as the 'inactive' state of the enable signal. The transistor is conductive if the gate voltage is higher than the threshold voltage, thus the transistor is conductive when at least one of the stored state and the enable state is active, and the transistor is not conductive when both the stored state and the enable state are inactive.

Figure 6E:
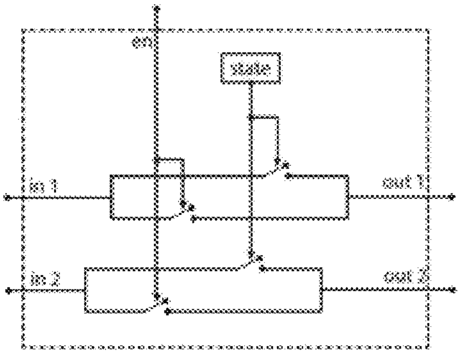

In an example, as illustrated by FIG. 6E, the OR cell may comprise two input lines and two output lines, wherein each input line is connected to an output line via the first switch controlled by the enable line and via the second switch controlled by the stored state, wherein the first and second switches are parallel to each other.

Figure 7A:
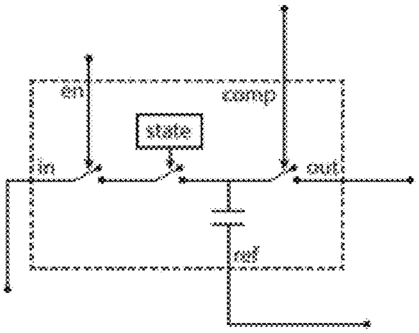
FIG. 7A is a circuit diagram of an example of a C cell.
Figure 7B:
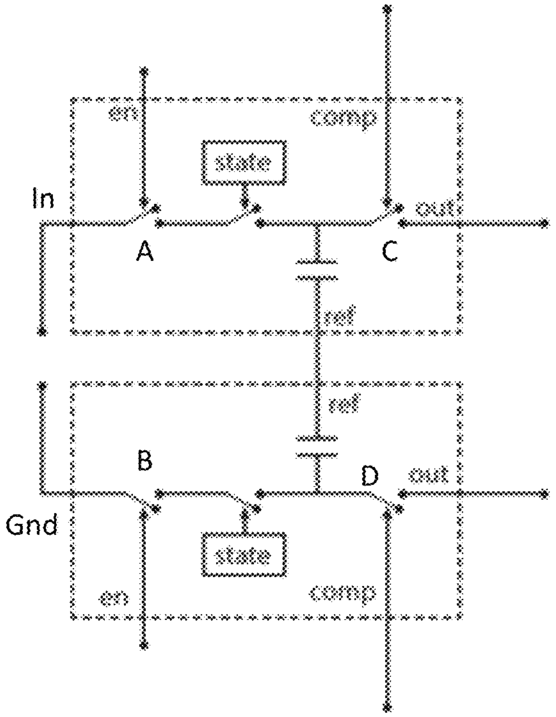
FIG. 7B-7D are circuit diagrams of example cells.
Figure 7C:
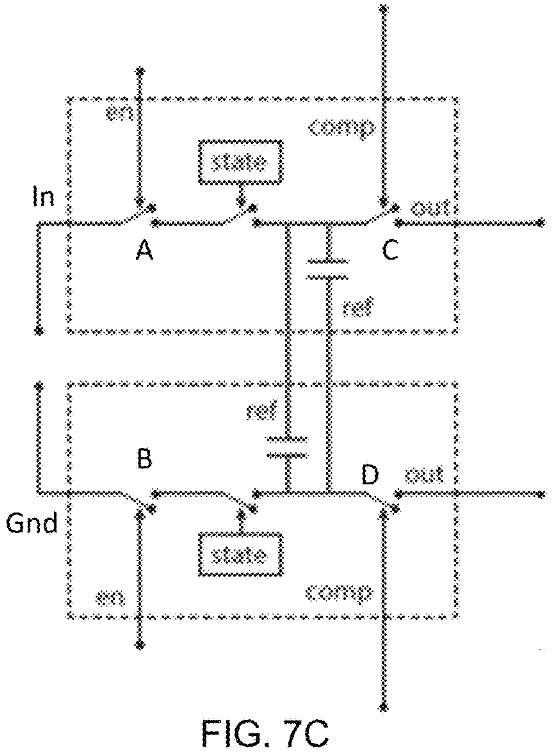
Figure 7D:
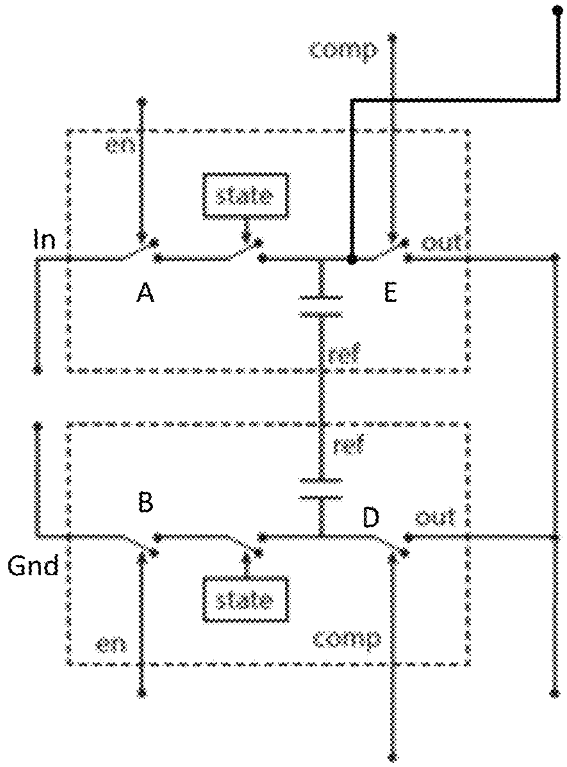

FIG. 7A illustrates a possible variation of the cell. This cell may be referred to as a Compute (or C) cell. Compute cells may be used to control the loading of the capacitors with the external input voltages corresponding to the vector. In an example, the cells used to implement the method described in FIGS. 2A-2C comprise C cells and comprises an AND cell, as in FIGS. 5A-5D, with a capacitor connected between the second switch and the output line, and a third switch between the capacitor and output. The third switch is controlled by a signal provided via an additional compute (comp) input line. In an example, the third switch corresponds to switch F in FIGS. 3C and 3D, wherein the third switch allows the capacitors to be separated during charging from the data inputs, but combined during computation. In an example, the third switch is conductive when the comp input is active, and non-conductive when comp is inactive. When the third switch is conductive, the charge stored in the capacitor is output from the cell. The terminal of the capacitor that is not connected to the switches is connected to an additional port of the C cell, labelled ref, that can be connected to an external voltage reference.

FIGS. 7B-7D illustrate the C cell of figure implemented in the circuit of FIGS. 3A and 3B. The two capacitors in series (FIGS. 7B and 7D) and in parallel (FIG. 7C) may be substituted with a single capacitor.

Figure 8:
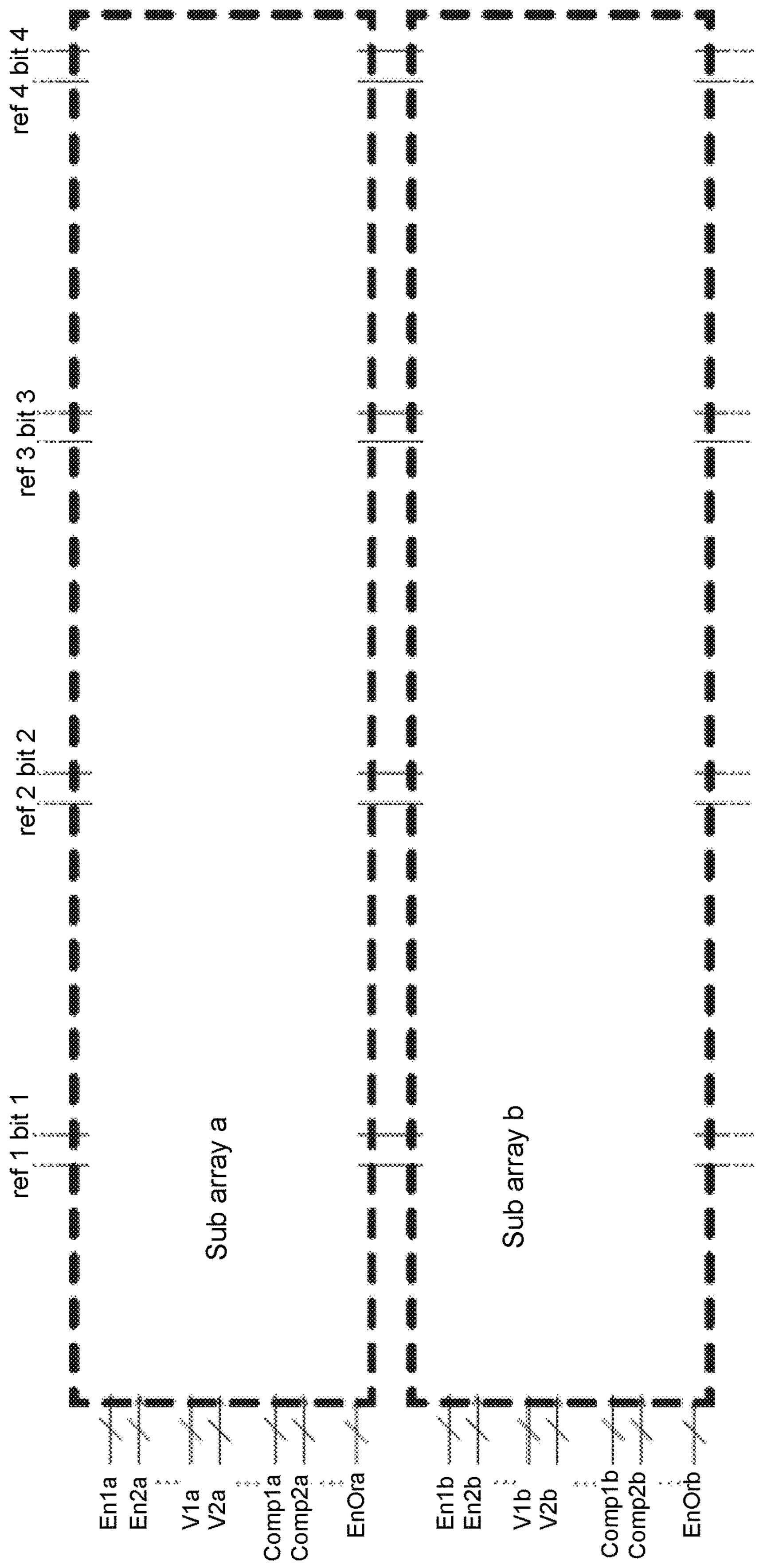
FIG. 8 is a schematic diagram of an example implementation of an array.

FIG. 8 illustrates that larger arrays can be constructed by stacking sub arrays of cells, such as the sub arrays depicted in FIGS. 9-13. FIG. 8 shows sub array a and sub array b. FIG. 8 shows example lines connected to each sub array as buses. The horizontal buses are labelled with a number suffix denoting row within a sub array, and a letter suffix denoting the sub array it is part of. Vertical busses Larger arrays can be constructed by adding more columns of cells or sub arrays of cells.

FIGS. 9-13 are alternative implementations of the sub-array of cells, constructed from AND, OR and C cells as described in relation to FIGS. 5-7, used in FIG. 8. In FIGS. 10-13, all columns have a uniform structure, and the variation to handle all scaling, averaging, and sum operations is handled by programming of the AND and OR cells. Therefore it is possible to have a uniform array structure that can be used for multiple different applications that use different scaling factors. This structure can also implement both average and sum operations, so that the voltage range of all active signals may be managed to avoid the issues arising from very high voltages and very low voltages. All cell programming (i.e. the setting of all 'state' values within the AND, OR, and C cells) takes place before the array is used for computation. Programming signals are not shown in FIGS. 8-13, and are not described here, but can be implemented using standard programming techniques for implementing the state storage in the cells. For example, read and write operations are described in relation to FIG. 2A. It is possible to change the numbers of cells of the different types in the array. In particular there can be more C cell rows per subsection than are shown in these figures. It is also possible to change the mix of the different types of AND cells.

In FIGS. 10-13, the Compute (C) cells store the static values in the static matrix by variable vector multiplication. These static values may be neural network weights data, hereinafter referred to as weights.

The vector to be multiplied by the weights stored in the cell array are provided as analog data inputs to the C cells. The data inputs are provided to the C cells using the wires V that run along rows of C cells, with a unique wire per row, wherein the data input signal is provided to all C cells in the respective row. In the examples illustrated in FIGS. 10-13, the data input lines are labelled V1*a*.

Also running along the rows of C cells are enable (En) and compute (comp) lines that are labelled with suffix numbers and letters in the same way as the data inputs. These connect to the enable and comp inputs respectively of all the C cells in the relevant row.

The data outputs of the C cells are connected to bit signal lines. Similarly the reference (Ref) ports of the C cells connect to reference lines. Each bit line and reference line runs along at least a section of a column, wherein the section of a column corresponds to the column length of a sub array. In an example, the bit signal lines illustrated in FIGS. 9 to 13 are different to the memory access bit lines described in relation to FIGS. 2A and 2B.

Figure 9:
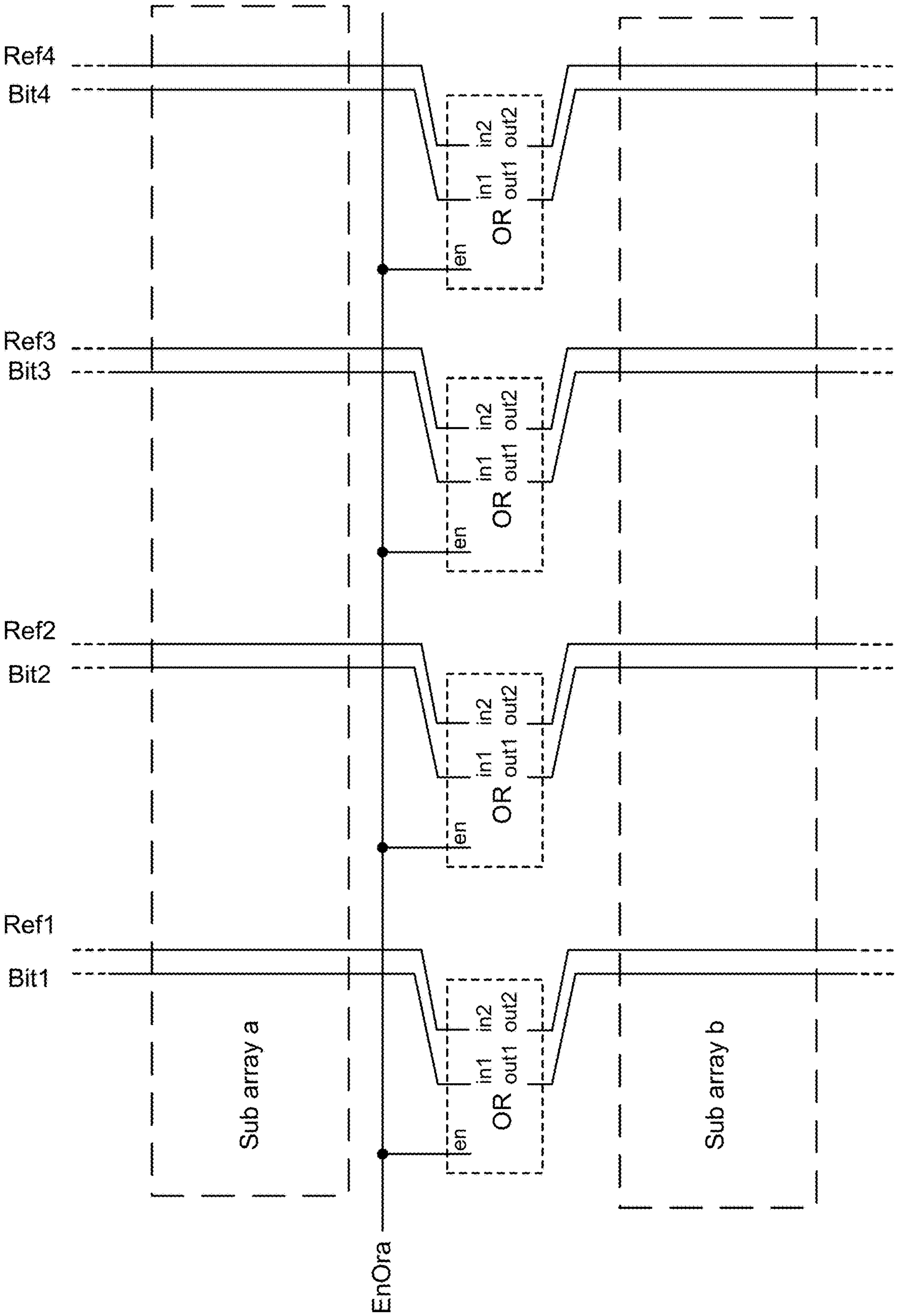
FIG. 9 is a schematic diagram of an example implementation of an array of cells.

As illustrated in FIG. 9, the 'bit' and 'ref' subsections of the wires along a column are separated by OR cells. These OR cells have their inputs connected to the bit and ref wires from one subsection (e.g. the one above the OR cell) and their outputs connected to the same wires in another subsection (e.g. the one below the OR cell). Therefore these OR cells can be used to selectively connect or disconnect the bit and ref wires in consecutive sub columns of C cells. Note that the in/out connections are actually bidirectional, so charge can flow in either direction through these OR cells. The enable signals for the OR cells are provided by an EnOr line that runs along the row of OR cells. The EnOr lines are labelled EnOr followed by a letter (i.e. subgroup) suffix in FIGS. 8-13.

Figure 10:
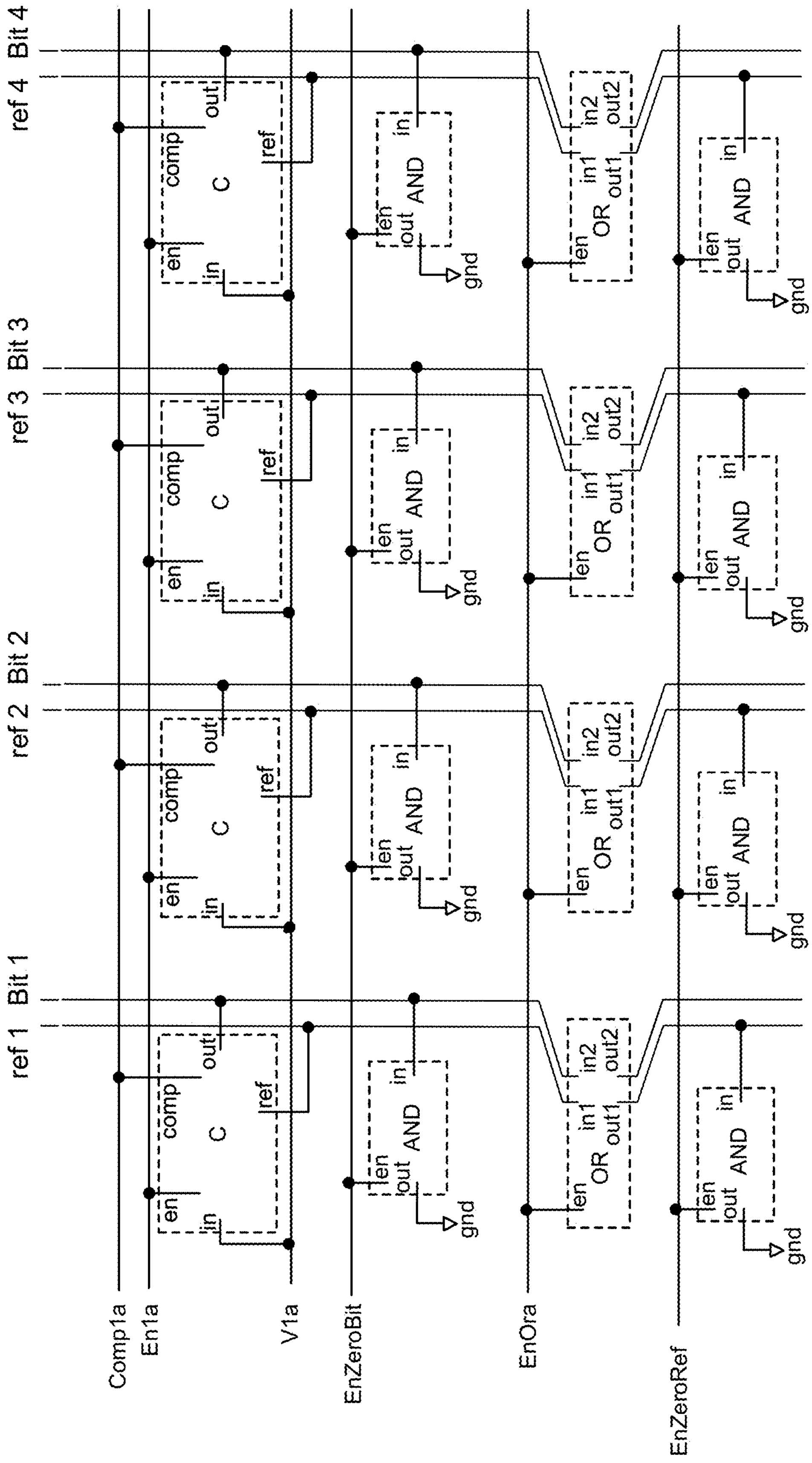
FIG. 10 is a circuit diagram of an example implementation of a sub array of cells.
Figure 11:
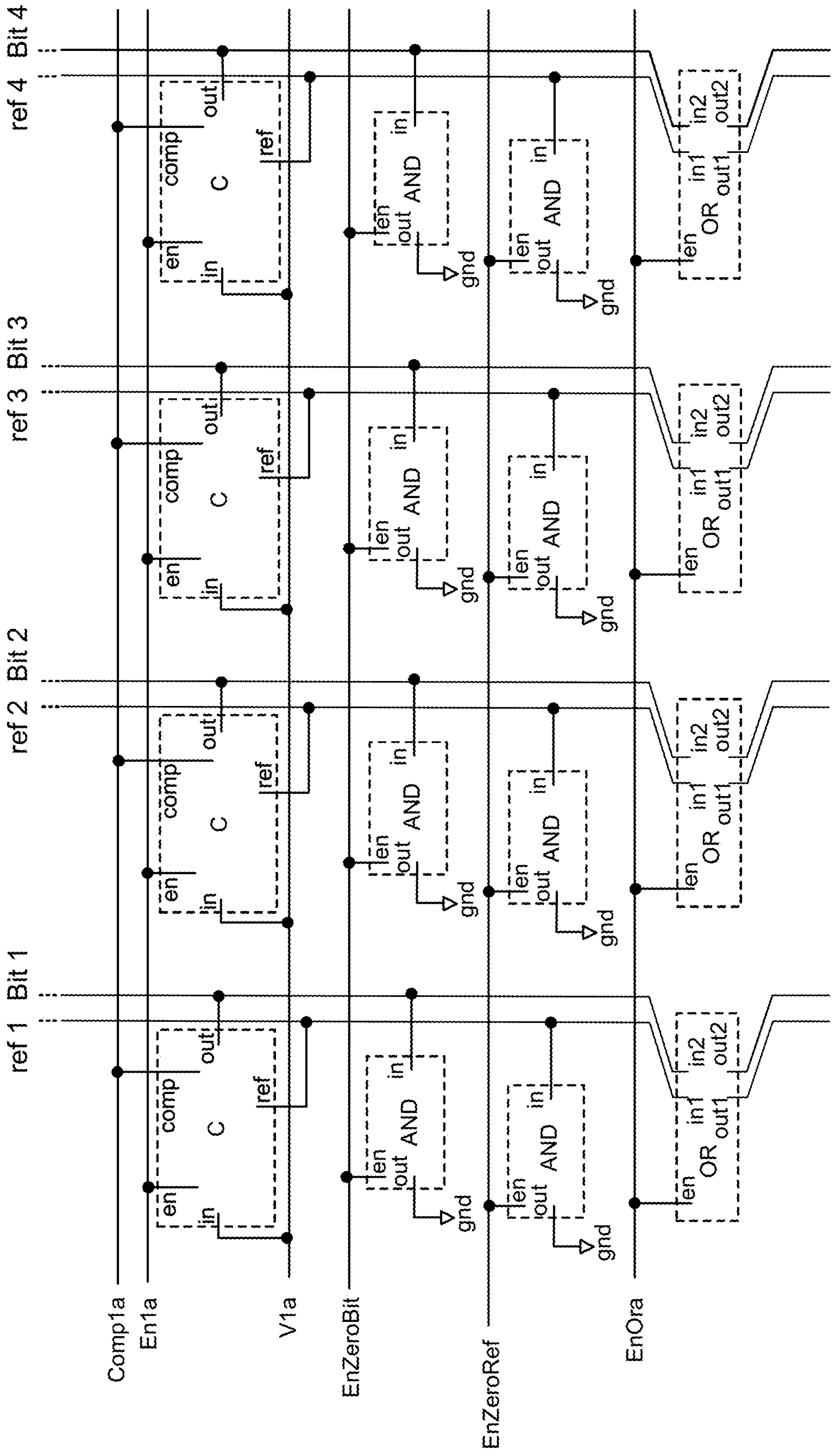
FIG. 11 is a circuit diagram of an example implementation of a sub array of cells.

In an example, AND cells are used to selectively ground the bit or ref wires in a subsection. The AND cells in FIGS. 10 and 11 are used for this purpose. One row can selectively ground the bit lines, and has an enable signal called EnZeroBit, and the other row can selectively ground the ref lines and has an enable signal called EnZeroRef.

In an example, as illustrated in FIGS. 10 and 11, the OR cell row and the AND cell row may be swapped. In FIG. 10, there is a uniform ordering of cells in this diagram, comprising, looking at section of a column, a group of C cells followed by an AND, OR, AND sequence. The sequence in FIG. 10 gives a uniform spacing between OR rows, which may help with balancing parasitic capacitances on the bit and ref segments.

Figure 12:
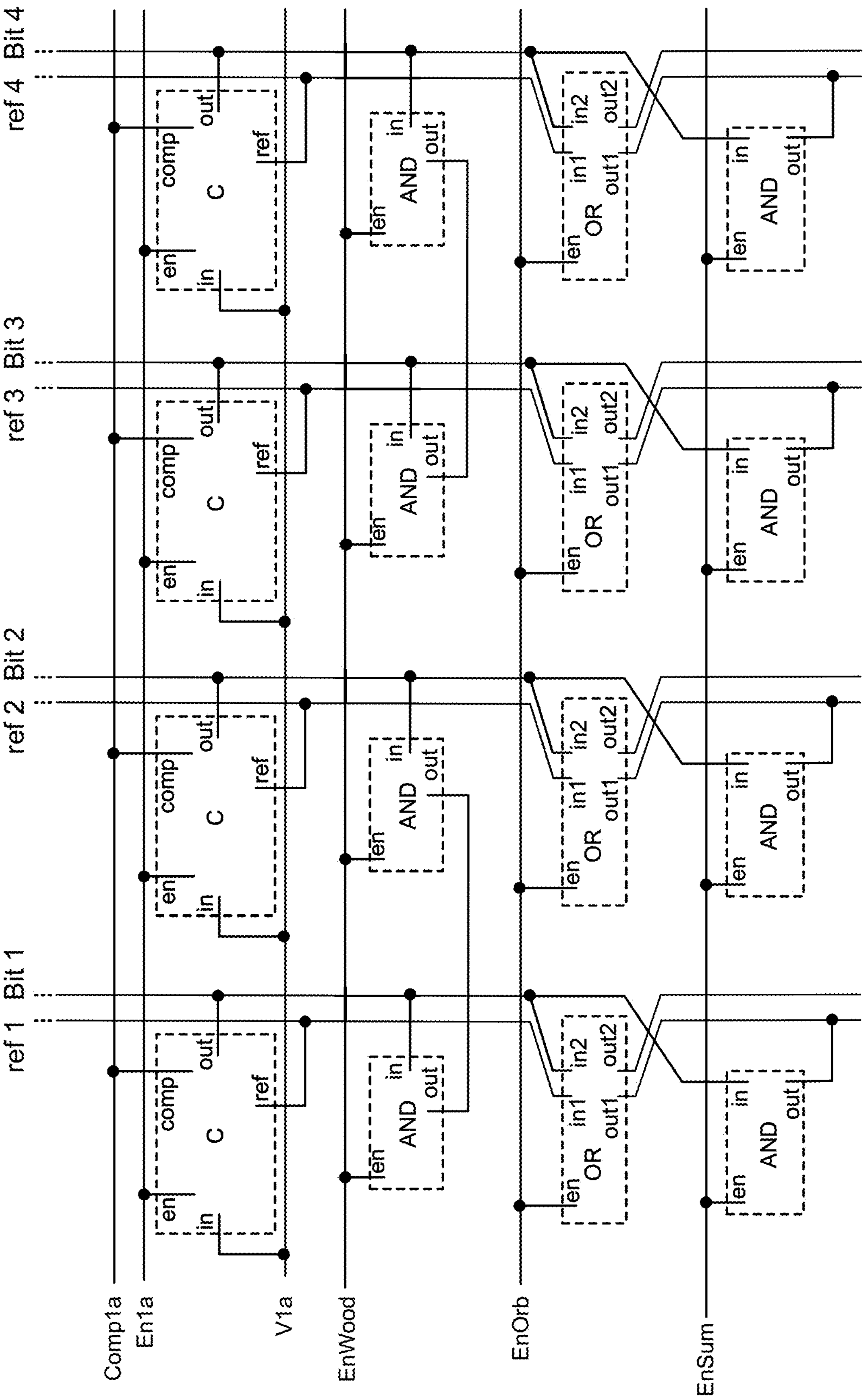
FIG. 12 is a circuit diagram of an example implementation of a sub array of cells.
Figure 13:
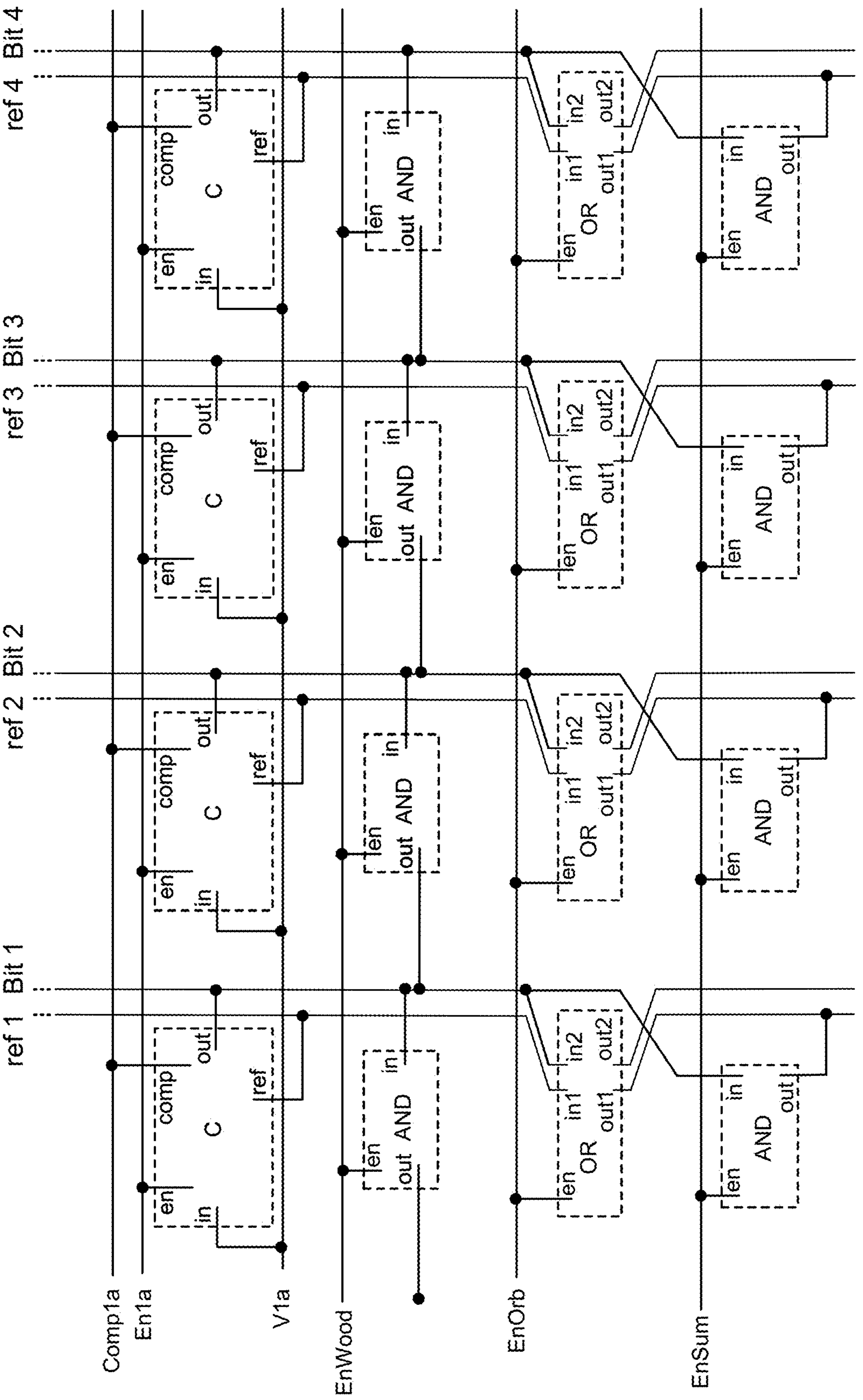
FIG. 13 is a circuit diagram of an example implementation of a sub array of cells.

In an example, AND cells are used to make connections between the 'bit' wires across groups of columns. In FIG. 12 this is achieved by having AND cells with their inputs connected to the bit signals, and their outputs connected to a separate wire that is shared across a predefined group of columns. In an example, the predefined group of columns is the number of columns that can be combined when doing a weighted sum across columns, corresponding to the maximum bit size of a weight of the matrix. In an example, fewer columns than the predefined group of columns may be used to store a weight by using AND cell programming, to disconnect the one or more columns that are not being used to store the weight from the wire shared across the predefined group of columns. FIG. 12 also uses a uniform ordering of cells, comprising, looking at a section of a column, a group of C cells followed by an AND, OR, AND sequence, but with a different connection pattern around the AND cells compared to the uniform ordering in FIG. 10, allowing the AND cells to make connections between the 'bit' wires across groups of columns. In FIG. 13 the AND cell inputs and outputs connect directly to the bit lines of adjacent columns. This is a more flexible arrangement, as connections can be made across groups of columns that are defined by the programming of the AND cells rather than by predefined wires. In this example, because the groups of columns are not predefined, there is no maximum number of columns that may be used to store a weight (other than the size of the array), and all boundaries between weights are set by programming the AND cells. However, it may be slower in operation when making connections across larger numbers of columns, as the total resistance from having multiple switches in series will be higher than in FIG. 12. Note that hybrid situations are possible—for instance there could be two rows of AND cells, both using the connection pattern of FIG. 12, but with different lengths of the shared wire, and/or overlapping shared wires. These types of rows use enable signals that run along the row, called EnWord.

In an example, AND cells are used to enable connections between bit wires in one subsection of C cells and the ref wires in the next subsection. This connection skips past the OR cell that is placed between the two subsections (i.e. it connects to the bit wire above the OR cell and to the ref wire below it). This connection is used to stack capacitances, to perform a capacitive sum. This row has a control signal called EnSum.

From this description it is clear that there are control and input signals that are row-based, and connect to all cells in a row, and there are column-based data processing signals (i.e. bit and ref) that are arranged in subsections running along columns.

The examples above provide flexibility at multiple levels in for matrix-vector multiplication.

For example, the size of subsections is flexible because it is defined by EnOr signals to indicate the cells used in each sub array.

In another example, the width of words is flexible, wherein the width of words is the groups of columns that are combined in relation to FIG. 1B. The width of words may be adjusted by using the AND cell connection pattern illustrated in FIG. 13. In an example, word sizes may be the same for different sub arrays, or different word sizes may be used in different sub arrays.

In another example, the weighting of columns within words is flexible. The weighting of columns within words may be defined by the OR cell programming. For example, in relation to FIGS. 2B and 2C, OR cells are used to connect the different columns and rows together. In FIG. 2B, the groups of cells are connected across the complete length of a column (i.e. same number of capacitors in each column) and this is accomplished by using the enable signals to the OR cells between rows of cells. In FIG. 2C only some of the capacitors are used (i.e. different numbers of cells in different columns), and this is accomplished by having the enable signal set to inactive for some of the OR cells in each column. In this way, the OR cell programming defines which capacitors of which cells should be included for performing the calculation.

In another example, the weighting of the sub arrays is flexible. The weighting of the sub arrays may be defined by programming of AND cells on EnZeroBit rows. In an example, AND cells reduce the stored voltage level in part of the array or in select sub arrays of cells, by allowing parts of groups of cells or sub arrays of cells to be set to zero. In an example, AND cells define regions are permanently separated or temporarily separated.

In another example, the choice of whether to combine sub arrays by averaging or adding is defined by the use of either EnOr signals or EnSum signals to combine the sub arrays, or by a combination of the EnOr signals and EnSum signals when using a combination of averaging and adding.

This flexibility may be exploited to manage signal magnitudes within the array in order to manage the dynamic range of intermediate signals in a large-scale analog processing system, with relative scaling of different partial results by using sub arrays. In particular, this flexibility avoids intermediate signals exceeding safe operating ranges for circuit components, as well as avoiding signals being too low that they are indistinguishable from noise.

An example of operation of the circuit is described in relation to FIGS. 1-14. The circuit may be used in an image recognition process, image generation process, speech recognition process or speech generation process. Initially, the capacitors in the C cells are set to 0 by activating all EnOr lines that connect to the OR cells and connecting the bit and ref lines to ground at the top and/or bottom edges of the array, and activating the 'comp' lines. Activating the OR cells connects all bit and ref line segments along the columns, so that the ground signal can propagate the height of the array. Activating the comp lines then allows the ground to propagate to the capacitors. Grounding of the bit and ref lines can also be assisted by activating the EnZeroBit and EnZeroRef lines, which will turn on connections to ground for cells with stored active states. The comp lines are then deactivated, so that the capacitors are isolated from the bit lines. The capacitors are then selectively loaded from the data inputs (V) by activating the enable signals (En1a etc) for all rows of C cells. This causes the capacitors in all cells that are storing an active state to be charged with an input corresponding to the stored state and the data input signal.

The capacitances of capacitors in C cells in a column are combined. The capacitances are combined with an averaging or a summing operation as described above. In an example, an averaging is performed, comprising disabling the enable signals of all rows of C cells and disabling EnZeroBit signals (if active). In an example, the averaging may comprise selectively deactivating some of the OR cell enable signals in order to divide the bit and ref wires into subsections. In an example, the averaging comprises selectively activating OR cells to determine the extent of the cells across which the averaging takes place, via the EnOr lines. This division requires having programmed some of the OR cells with an inactive state so that the stored state will not override the deactivating of the enable wires. After dividing, each subsection may contain at least one row of AND cells that may create links between columns (e.g. rows with an EnWord enable signal). Additionally, each subsection may contain at least one row of AND cells that can be used to connect the ref line to ground (e.g. rows with an EnZeroRef enable signal), and also at least one row that can be used to connect the bit wire to ground (e.g. rows with an EnZeroBit enable signal). The averaging may further comprise activating EnZeroRef signals, and requiring at least one AND cell on such a row in each column in each subsection to be storing an active state, to ensure that the ref segments in each subsection are connected to ground. The averaging may further comprise activating the 'comp' signals. This allows the capacitors to be connected together so that averaging takes place. In an example, not all 'comp' signals are activated when processing a matrix that is smaller than the size of the array A weighted average across columns is performed, to combine the column results to give the equivalent of multiplication with multi-bit weight. In an example, all EnOr signals are deactivated. The joining of ref and bit wires between groups of C cells is then determined by the programming of the OR cells according to a required weighting of the columns (as described in relation to FIGS. 2A-2D and FIG. 8). The weighted averaging across columns may further comprise activating the EnWord signals to the rows of AND cells that connect columns. In an example, as illustrated in FIG. 13, the AND cells in these rows are programmed to divide the columns up into groups that are connected together (i.e. active cells make connections within words, and inactive cells mark the boundaries between words). In an example, as illustrated in FIG. 12, the AND cells are programmed to connect columns to shared lines.

The weighting may be performed by deactivating the EnWord connections, activating the EnOr signals, and activating the EnZeroBit signals. In an example, the relevant AND cells must be programmed so that a subset of the bit lines in each subsection are discharged. In an example, the programming of these AND cells determines the weighting. The weighting may further comprise de-activating the EnOr signals again, deactivating the EnZeroBit signals, and reactivating the EnWord signals.

A particular example for performing the weighting is as follows. By deactivating EnWord connections, the individual bit columns corresponding to different bit precisions (or k values in the formulae given above) are separated. Then, by activating EnOr signals, groups of cells to be used for averaging are connected. Then, using EnZeroBit signals will selectively discharge some of the columns in those groups. The discharged columns are determined by the AND cell programming. This is followed by deactivating the EnZeroBit signals and activating some or all of the EnOr and EnWord signals to perform a new averaging, which includes weighting with the zeroes that have been introduced via the AND cells.

These weighted results corresponding to each sub array may be combined. In an example, the results may be averaged, the averaging comprising de-activating the EnWord signals, and activating the EnOr signals for the OR rows that separate the subsections. In an example, the results may be summed, the summing comprising deactivating the EnWord signals, activate the EnSum signals, with programming of the AND cells in these rows to enable the connecting of capacitors in series. In an example, the summing is performed when an end of each column of the sub arrays comprise an AND cells which enable connecting of capacitors in series. In an example, a hybrid approach can be used, with an initial averaging between some sub arrays, followed by summing with other sub arrays.

Figure 14:
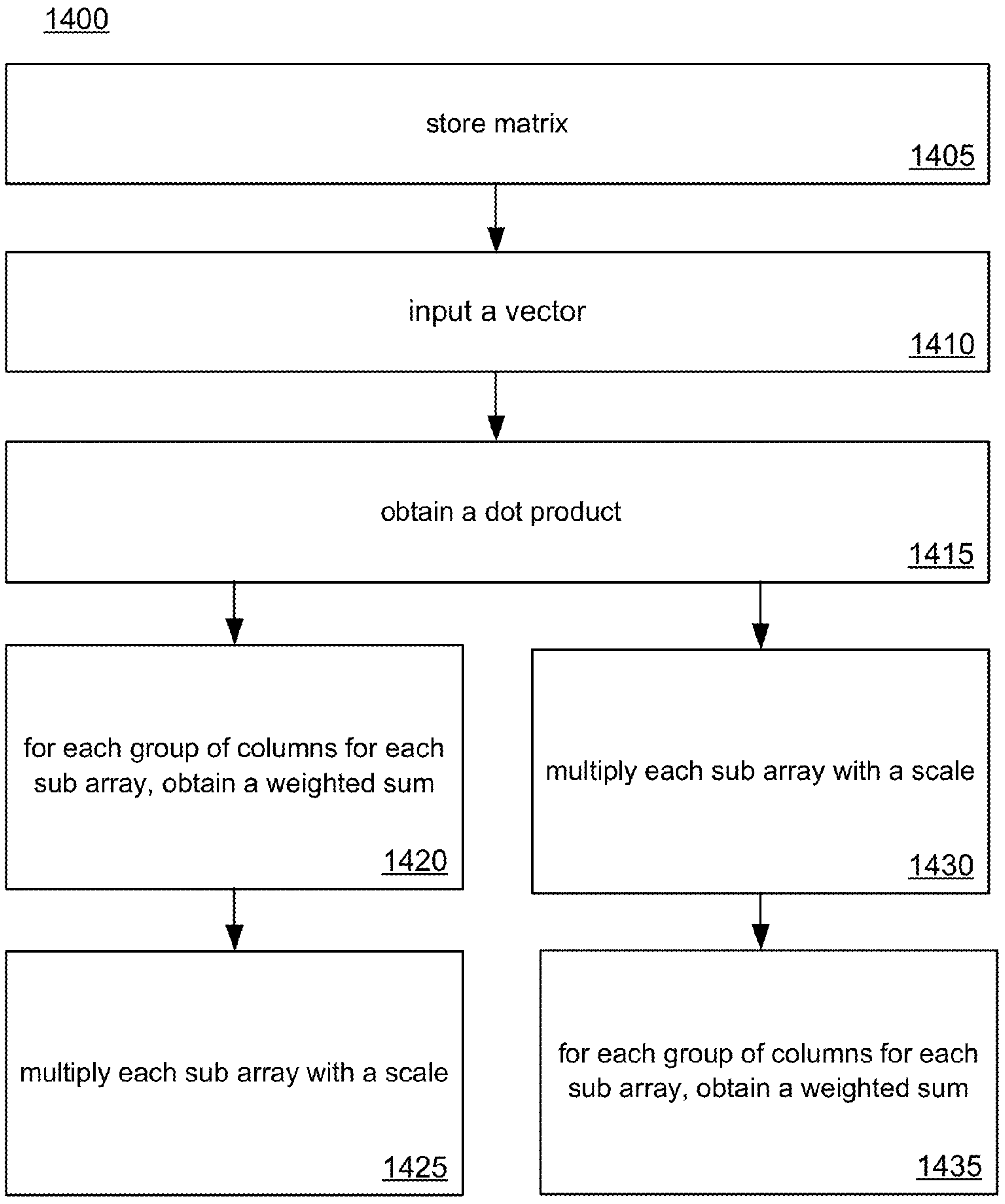
FIG. 14 is a flow diagram of a method of operating an analog circuit.

FIG. 14 illustrates a flow diagram of a method 1400 of multiplying a matrix with a vector performed by an analog compute-in-memory matrix multiplier. The multiplication may be useful for a variety of purposes such as machine learning or other calculations. For example, the multiplication may be used in an image recognition, image generation, speech recognition or speech generation process. The vector may store input values in analog form.

The method comprises storing 1405 a matrix in an array, such as an array of bitcells or other analog circuit array. The array comprises a plurality of sub arrays, each sub array having rows and groups of columns of storage cells, wherein the storing comprises storing, in each sub array, values of a sub matrix of the matrix in the storage cells. In this way numerical values in the matrix, such as neural network weights or neural network activations or other numerical values may be stored in the storage cells.

Each element of the matrix is stored in a row across a group of columns, each column of the group of columns associated with a bit value of an element of the sub matrix, wherein each sub array is associated with a scale. By using a plurality of sub arrays, numerical values of the matrix may be represented using different scales, as different ones of the sub arrays may be associated with different scales. In this way accuracy of the multiplication is facilitated since by using the different scales large ranges of values can be accommodated. The division of the array into sub arrays and/or which scales to use for which sub arrays may be determined according to the particular values in the matrix and vector. Switches between the cells may be controlled using a control unit in order to configure the sub arrays.

The method comprising inputting 1410 the vector to be multiplied with the stored matrix. In this way numerical values of the vector may be input into the circuit. The values may be input as voltages. The vector may be input in analog form such that the values of the vector are represented as continuous voltages. Each value of the vector is applied to cells in the corresponding row of the array storing the matrix. When the vector is inputted, a dot product is obtained 1415 for each bit value of each column with at least a portion of the vector. The dot product may be obtained efficiently by using the analog circuit such as by configuring switches between the cells, allowing current and voltages to settle, and reading off resulting voltages or currents.

In an example, the method proceeds to an operation of obtaining 1420 a weighted sum immediately after the operation of obtaining 1415 a dot product. For each group of columns for each sub array, obtain 1420 a weighted sum of the group of columns according to the associated bit value for each column of the group of columns. In an example this may be done by configuring switches so as to form the groups of columns so as to obtain the weighted sum. It is then possible to multiply 1425 each sub array with the scale associated with the sub array and obtain a sum of the columns of the scaled sub arrays corresponding to a column of the matrix. Voltages representing the scale values are configured to achieve the multiplication. Switches are configured to facilitate summing the columns of the scaled sub arrays. In this way efficient and accurate matrix vector multiplication is achieved in an analog circuit.

Alternatively, the order of the operations may be changed. For example, the operation of multiplying 1430 each sub array with a scale may be performed before obtaining 1435 the weighted sum, as illustrated with the alternative flow where the method proceeds to operation 1430 after operation 1415. Multiply 1430 each sub array with the scale associated with the sub array and obtain a sum of the columns of the scaled sub arrays corresponding to a column of the matrix. At operation 1435, after operation 1430, for each group of columns for each sub array, obtain 1435 a weighted sum of the group of columns according to the associated bit value for each column of the group of columns. Being able to use different orders of the operations gives versatility whilst not detrimenting accuracy. Being able to use different orders of the operations aids inter-operation with other processes. When considering issues of voltages in the circuit getting too large and risking loss of accuracy due to clipping by parasitic diodes or circuit damage, or of voltages being so low that they are indistinguishable from noise, being able to use different orders may provide flexibility of using the order that maintains accuracy for the particular values that are being handled by the circuit. The preferred order for performing a particular vector-matrix multiplication may be dependent on the distribution of the values of the matrix or the stored values in the circuit, so deferring the decision of which order to use until after the matrix is stored may provide flexibility to maintain accuracy.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A compute-in-memory matrix multiplier for multiplying a matrix with a vector, comprising:

an array comprising a plurality of sub arrays, each sub array having rows and groups of columns of storage cells, each sub array storing values of a sub matrix of the matrix in the storage cells, wherein each element of the matrix is stored in a row across a group of columns, each column of the group of columns associated with a bit value of an element of the sub matrix, wherein each sub array is associated with a scale;

wherein the compute-in-memory matrix multiplier is configured to:

perform a first operation comprising: for each sub array, obtain a dot product of each column with at least a portion of the vector;

subsequent to performing the first operation, perform a second operation comprising any one of two options, wherein the two options are:

(1) for each group of columns for each sub array, obtain a weighted sum of the dot products output by the columns of the group of columns according to the associated bit value for each column of the group of columns, and subsequently multiply the weighted sum corresponding to each group of columns of each sub array with the scale associated with the sub array and obtain a sum of the scaled weighted sums of each group of columns corresponding to a column of the matrix; and (2) multiply the dot products output by each column of each sub array with the scale associated with the sub array and obtain a sum of the scaled dot products for each column of the array, and subsequently, for each group of columns corresponding to a column of a matrix, obtain a weighted sum of the sum of scaled dot products output by each column of the group of columns according to the associated bit value for each column of the group of columns.

2. The compute-in-memory matrix multiplier of claim 1, wherein the array comprises multiple rows of sub arrays and/or multiple columns of sub arrays.

3. The compute-in-memory matrix multiplier of claim 1, wherein the scale associated with each sub array is determined based on an initial scale used to store each sub matrix of the matrix in the array, wherein the compute-in-memory matrix multiplier is further configured to:

determine a range of the elements in the sub matrix associated with the sub array; and determine the initial scale based on the determined range of elements.

4. The compute-in-memory matrix multiplier of claim 1, wherein the scale associated with each sub array is determined based on a further scaling used to store each sub matrix of the matrix in the array, wherein the further scaling is applied to all sub arrays in a same row.

5. The compute-in-memory matrix multiplier of claim 1, wherein each storage cell comprises a capacitor, storage unit, and at least one switch.

6. The compute-in-memory matrix multiplier of claim 5, further comprising a control unit, wherein:

the control unit is configured to activate control lines of the array in order to store values of the elements converted into a bit precision format into storage units of the storage cells of the sub arrays;

the control unit is configured to trigger one or more of the switches for each element in each sub array, to connect storage cells of each bit precision of the element stored across one of the group of columns together to form a weight row, and to trigger application of a voltage representing a value in an entry of the vector to the weight row, and do the same for each voltage and weight row;

the control unit is configured to trigger one or more of the switches to update the connections between the storage cells in each sub array such that storage cells in each sub array representing the same bit precision are connected;

the control unit is configured to trigger one or more of the switches to update the connections between the storage cells in each sub array such that the storage cells in each sub array representing the bit precisions are scaled according to the first bit precision format; the control unit is configured to trigger one or more of the switches to connect the sub arrays and output a capacitance of a capacitor of a connected storage cell.

7. The compute-in-memory matrix multiplier of claim 5, wherein the storage cells are connected with switches such that the capacitors of the storage cells in each column are connected in series, in parallel, or a combination of series and parallel.

8. The compute-in-memory matrix multiplier of claim 5, wherein the array further comprises at least one of:

a data input line adjacent to a row of storage cells, wherein the data input line provides a data signal to storage cells in the row, wherein the data signal provides a voltage representing a value in an entry of the vector to the weight row;

an enable line adjacent to the row of storage cells, wherein the enable line provides an activation signal to storage cells in the row to activate a stored state in the binary storage element;

a bit line adjacent to a column of storage cells, wherein the bit line is connected to an output node of each storage cell in the column of storage cells; and a reference line adjacent to the column of storage cells, wherein the reference line connects each storage cell of the column of storage cells to ground.

9. The compute-in-memory matrix multiplier of claim 5, wherein the array comprises a row of compute, C, cells connected to a compute line, wherein the compute line connects a row of compute cells in the array, wherein each compute cell outputs a charge stored in a capacitor when the compute line is active.

10. The compute-in-memory matrix multiplier of claim 5, wherein the array comprises a row of AND cells, wherein the AND cells are configured to connect selected cells of the array to ground.

11. The compute-in-memory matrix multiplier of claim 10, wherein columns of storage cells in the array are connected by AND cells or OR cells.

12. The compute-in-memory matrix multiplier of claim 10, wherein an input and an output of each AND cell is connected to the bit lines of adjacent columns.

13. The compute-in-memory matrix multiplier of claim 10, wherein an input of each AND cell is connected to the bit signals, and an output of each AND cell is connected to a separate line that is shared across a predefined group of columns.

14. The compute-in-memory matrix multiplier of claim 5, wherein the array further comprises a row of OR cells, wherein the first and second sub arrays are separated by the OR cells.

15. The compute-in-memory matrix multiplier of claim 1, wherein the elements of the matrix comprise neural network weights.

16. A method for multiplying a matrix with a vector in a compute-in-memory matrix multiplier, comprising:

storing the matrix in an array, wherein the array comprises a plurality of sub arrays, each sub array having rows and groups of columns of storage cells, wherein the storing comprises storing, in each sub array, values of a sub matrix of the matrix in the storage cells, wherein each element of the matrix is stored in a row across a group of columns, each column of the group of columns associated with a bit value of an element of the sub matrix, wherein each sub array is associated with a scale;

performing a first operation, comprising: for each sub array, obtaining a dot product for each bit value of each column with at least a portion of the vector;

subsequent to performing the first operation, performing a second operation comprising any one of two options, wherein the two options are:

(1) for each group of columns for each sub array, obtaining a weighted sum of the dot products output by the columns of the group of columns according to the associated bit value for each column of the group of columns, and subsequently multiplying the weighted sum corresponding to each group of columns of each sub array with the scale associated with the sub array and obtaining a sum of the scaled weighted sums of each group of columns corresponding to a column of the matrix; and (2) multiplying the dot products output by each column of each sub array with the scale associated with the sub array and obtaining a sum of the scaled dot products for each column of the arrays, and subsequently, for each group of columns corresponding to a column of the matrix, obtaining a weighted sum of the sum of scaled dot products output by each column of the group of columns according to the associated bit value for each column of the group of columns.

17. The method of claim 16, wherein the array comprises multiple rows of sub arrays and/or multiple columns of sub arrays.

18. The method of claim 16, wherein the scale associated with each sub array is determined based on an initial scale used to store each sub matrix of the matrix in the array, the method further comprising:

determining an initial scale associated with each sub array, comprising determining the range of weights in the sub matrix associated with the sub array; and determining an initial scale based on the determined range of weights.

19. The method of claim 16, wherein the scale associated with each sub array is determined based on a further scaling used to store each sub matrix of the matrix in the array, wherein the further scaling is applied to all sub arrays in a same row.

20. The method of claim 16, wherein each storage cell comprises a capacitor, storage unit, and at least one switch.

* * * * *